United States Patent
Ogura et al.

(10) Patent No.: US 9,751,997 B2
(45) Date of Patent: Sep. 5, 2017

(54) METAL PARTICLE DISPERSION, ARTICLE AND SINTERED FILM USING METAL PARTICLE DISPERSION, AND METHOD FOR PRODUCING SINTERED FILM

(71) Applicant: DAI NIPPON PRINTING CO., LTD., Tokyo-to (JP)

(72) Inventors: Michihiro Ogura, Tokyo-to (JP); Tomoki Murata, Tokyo-to (JP); Yoshinobu Omori, Tokyo-to (JP); Naonobu Yoshi, Tokyo-to (JP); Mikiko Hojo, Tokyo-to (JP); Masanori Sawada, Tokyo-to (JP); Shigehiro Ueno, Tokyo-to (JP); Shinsuke Nagino, Tokyo-to (JP)

(73) Assignee: DAI NIPPON PRINTING CO., LTD., Tokyo-to (JP)

( * ) Notice: Subject to any disclaimer, the term of this patent is extended or adjusted under 35 U.S.C. 154(b) by 62 days.

(21) Appl. No.: 14/433,202

(22) PCT Filed: Sep. 27, 2013

(86) PCT No.: PCT/JP2013/076335
§ 371 (c)(1),
(2) Date: May 13, 2015

(87) PCT Pub. No.: WO2014/054539
PCT Pub. Date: Apr. 10, 2014

(65) Prior Publication Data
US 2015/0252157 A1    Sep. 10, 2015

(30) Foreign Application Priority Data
Oct. 3, 2012    (JP) .................................. 2012-221715

(51) Int. Cl.
*C08K 3/08*    (2006.01)
*C08K 3/22*    (2006.01)
(Continued)

(52) U.S. Cl.
CPC ............... *C08J 5/18* (2013.01); *B22F 1/0022* (2013.01); *C08F 8/44* (2013.01); *C08F 265/06* (2013.01); *C08F 290/046* (2013.01); *C08F 290/062* (2013.01); *C08K 3/08* (2013.01); *C08K 3/22* (2013.01); *C08K 3/2279* (2013.01); *C08K 3/30* (2013.01); *C08L 55/005* (2013.01); *C09D 155/005* (2013.01); *H01B 1/22* (2013.01); *B22F 7/04* (2013.01); *B22F 2007/047* (2013.01); *C08K 2003/0806* (2013.01); *C08K 2003/2227* (2013.01); *C08K 2003/2231* (2013.01); *C08K 2003/3009* (2013.01)

(58) Field of Classification Search
CPC .......... C08K 3/08; C08K 3/22; C08K 3/2279; C08K 3/30; C08K 2003/0806; C08K 2003/2227; C08K 2003/2231; C08K 2003/2009
See application file for complete search history.

(56) References Cited

U.S. PATENT DOCUMENTS

2011/0003241 A1    1/2011  Kaneko et al.
2012/0267151 A1   10/2012  Hojo et al.

FOREIGN PATENT DOCUMENTS

JP    2005-118723 A    5/2005
JP    2005-272755 A   10/2005
(Continued)

OTHER PUBLICATIONS

International Search Report; dated Dec. 5, 2013; PCT/JP2013/076335.

*Primary Examiner* — Robert Harlan
(74) *Attorney, Agent, or Firm* — Ladas & Parry LLP

(57) ABSTRACT

The present invention is to provide a metal particle dispersion which has low viscosity and excellent dispersibility and dispersion stability, and in which the precipitation of the metal particles is inhibited. Disclosed is a metal particle dispersion comprising metal particles, a dispersant and a solvent, wherein the metal particles contain one or more selected from the group consisting of gold, silver, copper, nickel, platinum, palladium, molybdenum, aluminum, antimony, tin, chromium, lanthanum, indium, gallium and germanium, and wherein the dispersant is a graft copolymer having at least one constitutional unit represented by the following general formula (I) and at least one constitutional unit represented by the following general formula (II), and in which at least part of nitrogen sites of the constitutional units represented by the general formula (I) each form a salt with at least one selected from the group consisting of a halogenated hydrocarbon, an acidic phosphorus compound represented by the following general formula (V), and a sulfonic acid compound represented by the following general formula (VI):

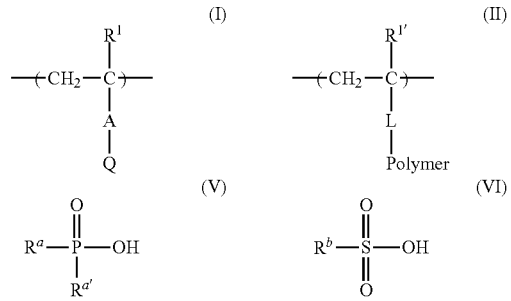

(symbols shown in the general formulae (I), (II), (V) and (VI) are as described in the Description.)

7 Claims, 1 Drawing Sheet

(51) Int. Cl.
  *C08K 3/30*  (2006.01)
  *C08J 5/18*  (2006.01)
  *C08F 265/06*  (2006.01)
  *B22F 1/00*  (2006.01)
  *C08F 290/04*  (2006.01)
  *C08F 290/06*  (2006.01)
  *C09D 155/00*  (2006.01)
  *C08L 55/00*  (2006.01)
  *H01B 1/22*  (2006.01)
  *C08F 8/44*  (2006.01)
  *B22F 7/04*  (2006.01)

(56) References Cited

FOREIGN PATENT DOCUMENTS

| | | | | |
|---|---|---|---|---|
| JP | 2009-203462 A | 9/2009 | | |
| JP | 2009-227736 A | 10/2009 | | |
| JP | 2009-265649 A | 11/2009 | | |
| JP | 2010-053171 | * 3/2010 | ............ | C08F 290/04 |
| JP | 2010-053171 A | 3/2010 | | |
| JP | 2010-229544 A | 10/2010 | | |
| JP | 2012-255148 A | 12/2012 | | |
| WO | 2011/040189 A1 | 4/2011 | | |
| WO | 2012/157784 A1 | 11/2012 | | |

* cited by examiner

METAL PARTICLE DISPERSION, ARTICLE AND SINTERED FILM USING METAL PARTICLE DISPERSION, AND METHOD FOR PRODUCING SINTERED FILM

TECHNICAL FIELD

The present invention relates to a metal particle dispersion, an article and sintered film using the metal particle dispersion, and a method for producing a sintered film.

BACKGROUND ART

Fine metal particles having a particle diameter of several nanometers to several tens of nanometers show various kinds of physical and chemical characteristics that are different from those of conventional metal materials. Accordingly, it is expected that such fine metal particles can be applied in a wide range of areas such as electroconductive paste, transparent electroconductive film, light blocking filter, chemical sensor, catalyst, antimicrobial material, light guiding member, gas barrier material, light scattering/reflecting member, light diffusing member, photosensitive material, photoelectric conversion element, fluorescent material and color material. The metal particles can be formed into a metal particle dispersion in the form of ink or paste by being dispersed in a solvent.

For example, a metal particle dispersion in which metal particles comprising a metal oxide such as ITO (tin-doped indium oxide) or ATO (antimony-doped tin oxide) are uniformly dispersed in a matrix material, is used for the purpose of forming a transparent electroconductive film or a heat ray shielding film. In this case, when metal particles having a particle diameter of more than several tens of nanometers are used, visible light is scattered and thus the film looks cloudy. By using metal particles having a particle diameter of less than several tens of nanometers, it is expected that a highly transparent optical material can be obtained, which is able to inhibit light scattering.

For metal particles, it is known that the melting point is dramatically decreased by reducing the size. This is because as the particle diameter decreases, the specific surface area increases and thus the surface energy increases. By using this effect, the sintering of metal particles can be promoted at lower temperature than ever before, in the method of forming a circuit pattern by directly printing a pattern on a base material, using a metal particle dispersion. Accordingly, it is expected that it would be possible to increase productivity dramatically higher than conventional methods such as a photoresist method, and also it would be possible to form circuits on resin base materials with low heat resistance, which have been difficult to use, by printing.

As just described, fine metal particles are widely used in the form of metal particle dispersions, and fine metal particle dispersions with better dispersibility and dispersion stability have been desired.

In Patent Literature 1, as a technique to obtain excellent dispersion stability of metal oxide fine particles, a coating composition for an antireflection film is disclosed, which contains a specific type of metal oxide fine particles, a non-ionic organic dispersant, a binder and an organic solvent.

In Patent Literature 2, as an ink composition that is capable of printing an image or a letter having excellent metallic luster by an inkjet printing method, the use of metal colloid particles is disclosed, which are prepared by coating metal nanoparticles with protective colloid containing an organic compound having a carboxyl group and a polymer dispersant.

However, the methods of Patent Literatures 1 and 2 need a large amount of dispersant to disperse highly concentrated metal particles, and a further increase in dispersibility has been required.

A metal microparticle dispersion is disclosed in Patent Literature 3, which contains a specific type of metal microparticles, a polymeric dispersant having a specific polyester skeleton, and a dispersion medium.

Patent Literature 3 describes that the specific polymeric dispersant have a high effect on the dispersibility of the metal microparticles and can be easily volatilized at a subsequent burning step. However, as shown in the below-mentioned Comparative Examples, by the method of Patent Literature 3, the storage stability of the metal microparticle dispersion cannot be sufficient; therefore, the metal microparticles sometimes precipitate after a certain period of storage.

CITATION LIST

Patent Literature 1: Japanese Patent Application Laid-Open (JP-A) No. 2005-272755
Patent Literature 2: JP-A No. 2009-227736
Patent Literature 3: International Publication No. WO2011/040189

SUMMARY OF INVENTION

Technical Problem

As described above, there is a demand for a metal particle dispersion in which fine metal particles are uniformly dispersed. However, in general, since metal particles have high specific gravity and are likely to precipitate, it is quite difficult to obtain a dispersion with high dispersibility and dispersion stability. Also, as the particle diameter decreases, it is more difficult to prepare a dispersion with excellent dispersibility and dispersion stability.

The present invention was achieved in light of the above circumstances. An object of the present invention is to provide a metal particle dispersion which has excellent dispersibility and dispersion stability and in which the precipitation of the metal particles is inhibited, and an article comprising a coating film, molded product or sintered film of the metal particle dispersion according to the present invention or of a composition containing the metal particle dispersion according to the present invention.

Solution to Problem

To achieve the above object, the inventors of the present invention made diligent research and have found that by using specific metal particles in combination with a specific dispersant, it is possible to obtain excellent dispersibility and dispersion stability.

The present invention was completed based on this finding.

The metal particle dispersion of the present invention comprises metal particles, a dispersant and a solvent,
wherein the metal particles contain one or more selected from the group consisting of gold, silver, copper, nickel, platinum, palladium, molybdenum, aluminum, antimony, tin, chromium, lanthanum, indium, gallium and germanium, and wherein the dispersant is a graft copolymer having at least one constitutional unit represented by the following general formula (I) and at least one constitutional unit represented by the following general formula (II), and in which at least part of nitrogen sites of the constitutional units represented by the general formula (I) each form a salt with at least one selected from the group consisting of a halogenated hydrocarbon, an acidic phosphorus compound represented by the following general formula (V), and a sulfonic acid compound represented by the following general formula (VI):

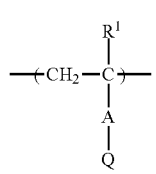
(I)

wherein "A" is a direct bond or a divalent linking group; $R^1$ is a hydrogen atom or a methyl group; and "Q" is a group represented by the following general formula (I-a) or a nitrogen-containing heterocyclic group which is able to form a salt and which can have a substituent group:

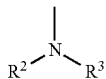
(I-a)

wherein $R^2$ and $R^3$ are each independently a hydrogen atom or a hydrocarbon group which can contain a heteroatom, and $R^2$ and $R^3$ can be the same as or different from each other;

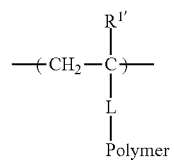
(II)

wherein $R^{1\prime}$ is a hydrogen atom or a methyl group; "L" is a direct bond or a divalent linking group; and "Polymer" is a polymer chain having at least one constitutional unit represented by the following general formula (III) or (IV):

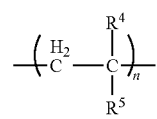
(III)

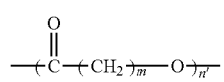
(IV)

wherein $R^4$ is a hydrogen atom or a methyl group; $R^5$ is a hydrocarbon group, a cyano group or a monovalent group represented by $-[CH(R^6)-CH(R^7)-O]_x-R^8$, $-[(CH_2)_y-O]_z-R^8$, $-[CO-(CH_2)_y-O]_z-R^8$, $-CO-O-R^9$ or $-O-CO-R^{10}$; $R^6$ and $R^7$ are each independently a hydrogen atom or a methyl group; $R^8$ is a hydrogen atom, a hydrocarbon group or a monovalent group represented by $-CHO$, $-CH_2CHO$ or $-CH_2COOR^{11}$; $R^9$ is a hydrocarbon group, a cyano group or a monovalent group represented by $-[CH(R^6)-CH(R^7)-O]_x-R^8$, $-[(CH_2)_y-O]_z-R^8$ or $-[CO-(CH_2)_y-O]_z-R^8$; $R^{10}$ is an alkyl group having 1 to 18 carbon atoms; $R^{11}$ is a hydrogen atom or an alkyl group having 1 to 5 carbon atoms;

the hydrocarbon group can have a substituent group;

m is an integer of 1 to 5; n and n' are each an integer of 5 to 200; x is an integer of 1 to 18; y is an integer of 1 to 5; and z is an integer of 1 to 18;

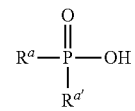
(V)

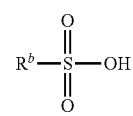
(VI)

wherein $R^a$ and $R^{a\prime}$ are each independently a hydrogen atom, a hydroxyl group, a hydrocarbon group or a monovalent group represented by $-[CH(R^c)-CH(R^d)-O]_s-R^e$, $-[(CH_2)_t-O]_u-R^e$, or $-O-R^{a\prime\prime}$; $R^{a\prime\prime}$ is a hydrocarbon group or a monovalent group represented by $-[CH(R^c)-CH(R^d)-O]_s-R^e$, $-[(CH_2)_t-O]_u-R^e$, $-C(R^f)(R^g)-C(R^h)(R^i)-OH$ or $-CH_2-C(R^j)(R^k)-CH_2-OH$;

$R^b$ is a hydrocarbon group or a monovalent group represented by $-[CH(R^c)-CH(R^d)-O]_s-R^e$, $-[(CH_2)_t-O]_u-R^e$ or $-O-R^{b\prime}$; $R^{b\prime}$ is a hydrocarbon group or a monovalent group represented by $-[CH(R^c)-CH(R^d)-O]_s-R^e$ or $-[(CH_2)_t-O]_u-R^e$;

$R^c$ and $R^d$ are each independently a hydrogen atom or a methyl group; $R^e$ is a hydrogen atom, a hydrocarbon group or a monovalent group represented by $-CHO$, $-CH_2CHO$ or $-CH_2COOR^1$; $R^1$ is a hydrogen atom or an alkyl group having 1 to 5 carbon atoms; $R^f$, $R^g$, $R^h$, $R^i$, $R^j$ and $R^k$ are each independently a hydrogen atom, a hydrocarbon group or a group in which hydrocarbon groups are bound by at least one of an ether bond and an ester bond, and $R^f$ and $R^h$ can be bound to each other to form a cyclic structure; when the cyclic structure is formed, the cyclic structure can have a substituent group $R^n$, and $R^n$ is a hydrogen atom, a hydrocarbon group or a group in which hydrocarbon groups are bound by at least one of an ether bond and an ester bond;

the hydrocarbon group as $R^a$, $R^{a\prime}$ and $R^b$ can have a substituent group;

s is an integer of 1 to 18; t is an integer of 1 to 5; and u is an integer of 1 to 18.

In the metal particle dispersion of the present invention, the metal particles preferably have an average primary particle diameter of 5 to 200 nm.

The present invention also provides an article comprising a coating film, molded product or sintered film of the metal particle dispersion of the present invention or of a composition containing the metal particle dispersion of the present invention.

Advantageous Effects of Invention

According to the present invention, it is possible to provide a metal particle dispersion which has excellent dispersibility and dispersion stability and in which the precipitation of the metal particles is inhibited, and an article comprising a coating film, molded product or sintered film of the metal particle dispersion of the present invention or of a composition containing the metal particle dispersion of the present invention.

DESCRIPTION OF EMBODIMENTS

Figure 1:
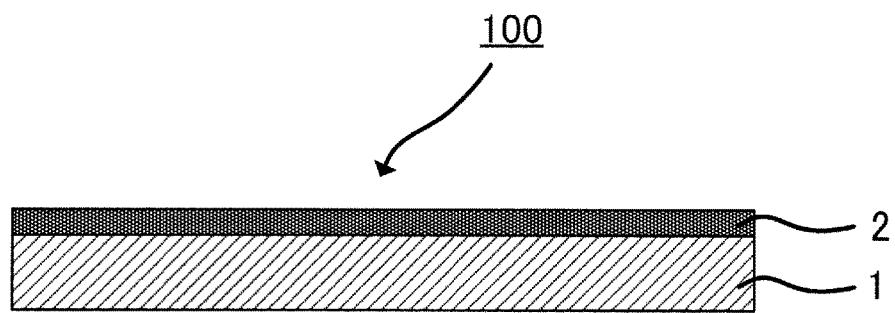
FIG. 1 is a schematic view of an example of the article of the present invention.

Hereinafter, the metal particle dispersion and the article of the present invention will be described.

In the present invention, "light" encompasses electromagnetic waves with wavelengths in the visible and non-visible ranges. It further encompasses radial rays such as microwaves and electron beams. More specifically, it encompasses electromagnetic waves with wavelengths of 5 μm or less and electron beams. Also in the present invention, "(meth)acrylic" means any one of acrylic and methacrylic, and "(meth)acrylate" means any one of acrylate and methacrylate.

[Metal Particle Dispersion]

The metal particle dispersion of the present invention comprises metal particles, a dispersant and a solvent, wherein the metal particles contain one or more selected from the group consisting of gold, silver, copper, nickel, platinum, palladium, molybdenum, aluminum, antimony, tin, chromium, lanthanum, indium, gallium and germanium, and wherein the dispersant is a graft copolymer having at least one constitutional unit represented by the following general formula (I) and at least one constitutional unit represented by the following general formula (II), and in which at least part of nitrogen sites of the constitutional units represented by the general formula (I) each form a salt with at least one selected from the group consisting of a halogenated hydrocarbon, an acidic phosphorus compound represented by the following general formula (V), and a sulfonic acid compound represented by the following general formula (VI):

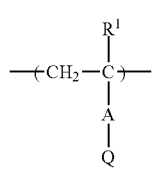

(I)

wherein "A" is a direct bond or a divalent linking group; $R^1$ is a hydrogen atom or a methyl group; and "Q" is a group represented by the following general formula (I-a) or a nitrogen-containing heterocyclic group which is able to form a salt and which can have a substituent group:

(I-a)

wherein $R^2$ and $R^3$ are each independently a hydrogen atom or a hydrocarbon group which can contain a heteroatom, and $R^2$ and $R^3$ can be the same as or different from each other;

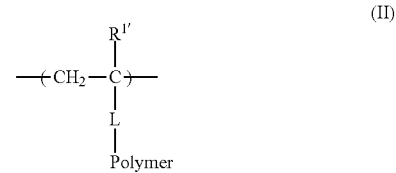

(II)

wherein $R^{1\prime}$ is a hydrogen atom or a methyl group; "L" is a direct bond or a divalent linking group; and "Polymer" is a polymer chain having at least one constitutional unit represented by the following general formula (III) or (IV):

(III)

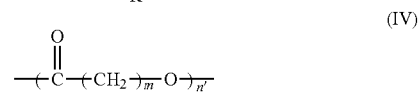

(IV)

wherein $R^4$ is a hydrogen atom or a methyl group; $R^5$ is a hydrocarbon group, a cyano group or a monovalent group represented by $-[CH(R^6)-CH(R^7)-O]_x-R^8$, $-[(CH_2)_y-O]_z-R^8$, $-[CO-(CH_2)_y-O]_z-R^8$, $-CO-O-R^9$ or $-O-CO-R^{10}$; $R^6$ and $R^7$ are each independently a hydrogen atom or a methyl group;

$R^8$ is a hydrogen atom, a hydrocarbon group or a monovalent group represented by $-CHO$, $-CH_2CHO$ or $-CH_2COOR^{11}$; $R^9$ is a hydrocarbon group, a cyano group or a monovalent group represented by $-[CH(R^6)-CH(R^7)-O]_x-R^8$, $-[(CH_2)_y-O]_z-R^8$ or $-[CO-(CH_2)_y-O]_z-R^8$; $R^{10}$ is an alkyl group having 1 to 18 carbon atoms; $R^{11}$ is a hydrogen atom or an alkyl group having 1 to 5 carbon atoms;

the hydrocarbon group can have a substituent group;

m is an integer of 1 to 5; n and n' are each an integer of 5 to 200; x is an integer of 1 to 18; y is an integer of 1 to 5; and z is an integer of 1 to 18;

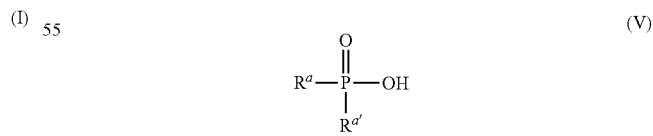

(V)

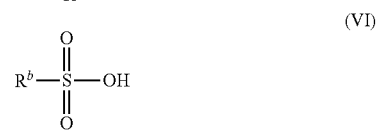

(VI)

wherein $R^a$ and $R^{a\prime}$ are each independently a hydrogen atom, a hydroxyl group, a hydrocarbon group or a monovalent group represented by $-[CH(R^c)-CH(R^d)-O]_s-R^e$, —[(CH$_2$)$_t$—O]$_u$—R$^e$, or —O—R$^{a'''}$; R$^{a'''}$ is a hydrocarbon group or a monovalent group represented by —[CH(R$^c$)—CH(R$^d$)—O]$_s$—R$^e$, —[(CH$_2$)$_t$—O]$_u$—R$^e$, —C(R$^f$)(R$^g$)—C(R$^h$)(R$^i$)—OH or —CH$_2$—C(R$^j$)(R$^k$)—CH$_2$—OH;

R$^b$ is a hydrocarbon group or a monovalent group represented by —[CH(R$^c$)—CH(R$^d$)—O]$_s$—R$^e$, —[(CH$_2$)$_t$—O]$_u$—R$^e$ or —O—R$^{b''}$; R$^{b''}$ is a hydrocarbon group or a monovalent group represented by —[CH(R$^c$)—CH(R$^d$)—O]$_s$—R$^e$ or —[(CH$_2$)$_t$—O]$_u$—R$^e$;

R$^c$ and R$^d$ are each independently a hydrogen atom or a methyl group; R$^e$ is a hydrogen atom, a hydrocarbon group or a monovalent group represented by —CHO, —CH$_2$CHO or —CH$_2$COOR$^1$; R$^1$ is a hydrogen atom or an alkyl group having 1 to 5 carbon atoms; R$^f$, R$^g$, R$^h$, R$^i$, R$^j$ and R$^k$ are each independently a hydrogen atom, a hydrocarbon group or a group in which hydrocarbon groups are bound by at least one of an ether bond and an ester bond, and R$^f$ and R$^h$ can be bound to each other to form a cyclic structure; when the cyclic structure is formed, the cyclic structure can have a substituent group R$''$, and R$''$ is a hydrogen atom, a hydrocarbon group or a group in which hydrocarbon groups are bound by at least one of an ether bond and an ester bond;

the hydrocarbon group as R$^a$, R$^{a'}$ and R$^b$ can have a substituent group;

s is an integer of 1 to 18; t is an integer of 1 to 5; and u is an integer of 1 to 18.

Due to the use of the above-specified metal particles in combination with the above-specified dispersant, the metal particle dispersion of the present invention is a metal particle dispersion which has excellent dispersibility and dispersion stability and in which the precipitation of the metal particles is inhibited. Also, the metal particle dispersion of the present invention can be a low-viscosity dispersion.

The mechanism that the effect as specified above is exerted by the above-specified combination, is not completely clear. However, it is presumed as follows.

Conventionally, there is such a problem with metal particle dispersions that since metal particles have larger specific gravity than other components in dispersions, they precipitate during storage.

In the metal particle dispersion of the present invention, the metal particles are dispersed by using, as the dispersant, the graft copolymer having at least one constitutional unit represented by the general formula (I) and at least one constitutional unit represented by the general formula (II), in which at least part of nitrogen sites of the constitutional units represented by the general formula (I) each form a salt with at least one selected from the group consisting of a halogenated hydrocarbon, a specific acidic phosphorus compound, and a specific sulfonic acid compound. Accordingly, it is presumed that the salt-forming site in the dispersant becomes insoluble in solvent and firmly adsorbs to the metal particle surface; therefore, the dispersion of the metal particles is stabilized. Also, because the constitutional unit represented by the general formula (II) of the dispersant has the polymer chain, its solubility in solvent is excellent. Because of this, the above-specified dispersant surrounds the metal particles and is stably present in the solvent. Therefore, it is presumed that the aggregation of the metal particles is less likely to occur; excellent dispersibility and dispersion stability are obtained; and the precipitation of the metal particles can be inhibited.

As described above, because the metal particle dispersion of the present invention has excellent metal particle dispersibility and dispersion stability, the content ratio of the dispersant to the metal particles can be decreased lower than ever before. Therefore, the metal particle dispersion of the present invention can be a low-viscosity fine metal particle dispersion. Also, when a metal film is formed by baking the metal particle dispersion, there is such an advantage that less organic components remain in the film after sintering.

In the present invention, a specific indication of low viscosity is that the viscosity of the metal particle dispersion is 10 mPa·s or less, preferably 3 mPa·s or less. The metal particle dispersion with such a low viscosity can be also preferably used as a composition for inkjet.

The metal particle dispersion for forming a sintered film according to the present invention comprises metal particles, a dispersant and a solvent, wherein the metal particles contain one or more selected from the group consisting of gold, silver, copper, nickel, platinum, palladium, molybdenum, aluminum, antimony, tin, chromium, lanthanum, indium, gallium, zinc and germanium, and wherein the dispersant is a graft copolymer having at least one constitutional unit represented by the following general formula (I) and at least one constitutional unit represented by the following general formula (II), and in which at least part of nitrogen sites of the constitutional units represented by the general formula (I) each form a salt with at least one selected from the group consisting of a halogenated hydrocarbon, an acidic phosphorus compound represented by the above-mentioned general formula (V), and a sulfonic acid compound represented by the above-mentioned general formula (VI):

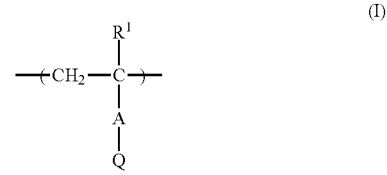

wherein "A" is a direct bond or a divalent linking group; R$^1$ is a hydrogen atom or a methyl group; and "Q" is a group represented by the following general formula (I-a) or a nitrogen-containing heterocyclic group which is able to form a salt and which can have a substituent group:

wherein R$^2$ and R$^3$ are each independently a hydrogen atom or a hydrocarbon group which can contain a heteroatom, and R$^2$ and R$^3$ can be the same as or different from each other;

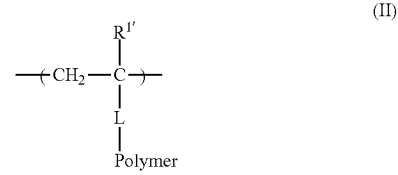

wherein R$^{1'}$ is a hydrogen atom or a methyl group; "L" is a direct bond or a divalent linking group; and "Polymer" is a polymer chain having at least one constitutional unit represented by the following general formula (III):

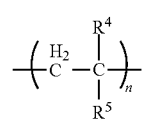

(III)

wherein $R^4$ is a hydrogen atom or a methyl group; $R^5$ is a branched alkyl group having 3 to 18 carbon atoms or a monovalent group represented by —CO—O—$R^9$; $R^9$ is a branched alkyl group having 3 to 18 carbon atoms; and n is an integer of 5 to 200.

The metal particle dispersion of the present invention comprises at least the metal particles, the dispersant and the solvent. As long as the effects of the present invention are not deteriorated, it can contain other components as needed.

Hereinafter, the components of the metal particle dispersion of the present invention will be described in detail.

<Metal Particles>

The metal particles used in the present invention are those containing one or more selected from the group consisting of gold, silver, copper, nickel, platinum, palladium, molybdenum, aluminum, antimony, tin, chromium, lanthanum, indium, gallium and germanium. In the present invention, "metal particles" encompass not only particles in a metal state but also particles in an alloy state, particles of a metal compound, etc. For example, "metal particles" can be particles each containing one or more selected from the group consisting of a metal, an alloy and a metal compound, such as the case where the surface of particles in a metal state is oxidized into a metal oxide. Typical examples thereof include metal particles containing one or more of the following: one or more metals selected from the group consisting of gold, silver, copper, nickel, platinum, palladium, molybdenum, aluminum, antimony, tin, chromium, lanthanum, indium, gallium and germanium; alloys thereof; and metal compounds thereof.

In the present invention, the metal particles used for the purpose of forming a sintered film are those containing one or more selected from the group consisting of gold, silver, copper, nickel, platinum, palladium, molybdenum, aluminum, antimony, tin, chromium, lanthanum, indium, gallium, zinc and germanium.

The metal type can be appropriately selected depending on the intended use, such as one with electroconductivity, antimicrobial properties, heat ray shielding properties, etc. When the metal particle dispersion of the present invention is formed into a metal film by baking or the like, one or more of a metal, alloy and metal compound can be appropriately selected so that the metal film exhibits electroconductivity, antimicrobial properties or heat ray shielding properties.

Examples of metals with electroconductivity include gold, silver, copper, nickel, platinum, palladium, molybdenum, aluminum, antimony, tin, chromium, indium, gallium, and germanium. Of them, from the viewpoint of electroconductivity, preferred are gold, silver, copper, nickel, etc. Examples of metals with antimicrobial properties include silver and copper. Examples of metals with excellent heat ray shielding properties include silver, copper, ITO (tin-doped indium oxide), ATO (antimony-doped tin oxide) and lanthanum hexaboride. As used herein, "heat shielding properties" encompass heat ray absorbing properties and heat ray reflecting properties.

Examples of the metal compounds include metal oxides, metal hydroxides, metal sulfides, metal selenides, metal tellurides, metal nitrides, metal phosphides, metal borides, metal silicides, metal carbides and metal chlorides. When a metal film is formed by baking, the metal compound preferably used is one that can be decomposed and changed into a metal when baked. Examples of metal compounds having silver include silver oxides. Examples of metal compounds having copper include copper oxides such as copper(I) oxide, copper(II) oxide and mixtures thereof.

Examples of the alloys include copper-nickel alloys and silver-palladium alloys.

As the metal compound having copper, a metal compound containing the following (i), (ii) and (iii) is preferably used for forming the sintered film:

(i) copper;

(ii) one or more selected from the group consisting of indium, gallium, zinc, tin and aluminum; and (iii) one or more selected from the group consisting of sulfur, selenium and tellurium.

Concrete examples of metal compounds containing the above (i), (ii) and (iii) include CIS (Cu—In—Se)-based compounds, CIGS (Cu—In—Ga—Se)-based compounds, CZTS (Cu—Zn—Sn—Se)-based compounds and CuSbSe. More specifically, there may be mentioned $CuAlS_2$, $CuGaS_2$, $CuInS_2$, $CuAlSe_2$, $CuGaSe_2$, $CuInSe_2$ (CIS), $Cu(In_{1-x}Ga_x)Se_2$ (CIGS), $Cu(In_{1-x}Al_x)Se_2$, $Cu(In_{1-x}Ga_x)(S,Se)_2$, $CuSbS_2$, $Cu_2SbS_3$, $Cu_2SnSe_3$, $CuZnSnS_2$ and $Cu(In_{1-x}Ga_x)Te_2$. Particularly preferred are $CuInS_2$, $CuInSe_2$ (CIS), $Cu(In,Ga)S_2$, $Cu(In,Ga)Se_2$ (CIGS) and $Cu_2ZnSn(S,Se)_2$. The sintered film of the metal particles containing the metal compound can be preferably used as a photoelectric conversion semiconductor film, for example.

The metal particles containing one more of the above-mentioned metals, alloys and metal compounds can be used solely or in combination of two or more.

For example, when used to form a sintered film, the dispersion can be a mixture of copper particles and one or more kinds of metal compound particles each containing one or more selected from the group consisting of indium, gallium, zinc, tin and aluminum and one or more selected from the group consisting of sulfur, selenium and tellurium, for example. Or, the dispersion can be a mixture of two or more kinds of metal compound particles each containing one or more selected from the group consisting of copper, indium, gallium, zinc, tin and aluminum and one or more selected from the group consisting of sulfur, selenium and tellurium.

The method for preparing the metal particles can be appropriately selected from conventionally known methods. For example, the metal particles can be obtained by: physical methods of grinding metal powder by mechanochemical treatment, etc.; chemical dry methods such as a chemical vapor deposition (CVD) method, a vapor deposition method, a sputtering method, a thermal plasma method and a laser method; and chemical wet methods such as a thermal decomposition method, a chemical reduction method, an electrolysis method, a ultrasonication method, a laser ablation method, a supercritical fluid method and a microwave synthesis method.

For example, in the vapor deposition method, fine particles are produced by bringing a thermally evaporated metal vapor into contact with a low vapor pressure liquid containing a dispersant, under high vacuum.

An example of the chemical reduction method is a method of producing fine particles by mixing a metal oxide and a reducing agent in a solvent, in the presence of a complexing agent and a protective colloid.

The complexing agent is such an agent that the donor atom of the ligand of the complexing agent binds to a metal ion or atom to form a metal complex compound. As the donor atom, a nitrogen atom, an oxygen atom and a sulfur atom are preferred. Examples of complexing agents in which the donor atom is a nitrogen atom include, but not limited to, amines and nitrogen-containing heterocyclic ring compounds such as imidazole and pyridine.

The protective colloid functions as a dispersion stabilizer for refined metal particles. Concrete examples thereof include: protein-based organic protective agents such as gelatin, arabic gum and casein; natural polymers such as starch and dextrin; cellulose-based organic protective agents such as hydroxyethyl cellulose; and hydrophilic synthetic polymers such as polyvinyl alcohol. Among them, protein-based protective colloids are preferred, from the viewpoint of dispersion stability.

In addition to the above methods, commercially-available metal particles can be appropriately used.

The average primary particle diameter of the metal particles can be appropriately determined, depending on the intended use. In general, it is determined in a range of 1 to 500 nm. From the point of view that low viscosity, excellent dispersibility and dispersion stability can be obtained and precipitates are less likely to occur, the average primary particle diameter of the metal particles is preferably 5 to 200 nm.

The average particle diameter of the metal particles can be obtained by the method of directly measuring the size of primary particles shown on an electron microscopy image. More specifically, the short-axis and long-axis diameters of each primary particle are measured, and the average was used as the particle diameter of each particle. Next, for 100 or more particles, the volume (mass) of each particle was obtained by approximating its volume (mass) by the volume (mass) of a cuboid with the above-obtained particle diameter, and the volume average particle diameter was obtained therefrom and used as the average particle diameter. The same result can be obtained by using any of a transmission electron microscope (TEM), scanning electron microscope (SEM) and scanning transmission electron microscope (STEM) as the electron microscope.

In the metal particle dispersion of the present invention, the content of the metal particles can be appropriately determined, depending on the intended use. From the viewpoint of dispersibility, the content is preferably in a range of 1 to 70% by mass, more preferably in a range of 5 to 50% by mass, with respect to the total amount of the metal particle dispersion. In the present invention, by using the metal particles in combination with the below-described dispersant, excellent metal particle dispersibility and dispersion stability can be obtained and precipitates are less likely occur, even when the content of the metal particles is higher than ever before.

<Dispersant>

The dispersant used in the present invention is a graft copolymer having at least one constitutional unit represented by the following general formula (I) and at least one constitutional unit represented by the following general formula (II), and in which at least part of nitrogen sites of the constitutional units represented by the general formula (I) each form a salt with at least one selected from the group consisting of a halogenated hydrocarbon, an acidic phosphorus compound represented by the following general formula (V), and a sulfonic acid compound represented by the following general formula (VI):

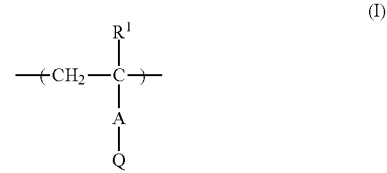

wherein "A" is a direct bond or a divalent linking group; $R^2$ is a hydrogen atom or a methyl group; and "Q" is a group represented by the following general formula (I-a) or a nitrogen-containing heterocyclic group which is able to form a salt and which can have a substituent group:

wherein $R^2$ and $R^3$ are each independently a hydrogen atom or a hydrocarbon group which can contain a heteroatom, and $R^2$ and $R^3$ can be the same as or different from each other;

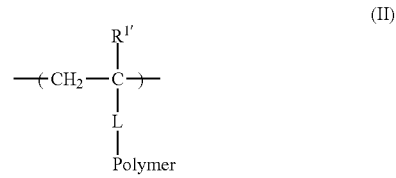

wherein $R^{1\prime}$ is a hydrogen atom or a methyl group; "L" is a direct bond or a divalent linking group; and "Polymer" is a polymer chain having at least one constitutional unit represented by the following general formula (III) or (IV):

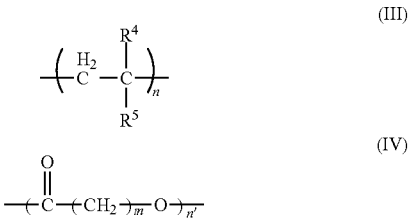

wherein $R^4$ is a hydrogen atom or a methyl group; $R^5$ is a hydrocarbon group, a cyano group or a monovalent group represented by $-[CH(R^6)-CH(R^7)-O]_x-R^8$, $-[(CH_2)_y-O]_z-R^8$, $-[CO-(CH_2)_y-O]_z-R^8$, $-CO-O-R^9$ or $-O-CO-R^{10}$; $R^6$ and $R^7$ are each independently a hydrogen atom or a methyl group;

$R^8$ is a hydrogen atom, a hydrocarbon group or a monovalent group represented by $-CHO$, $-CH_2CHO$ or $-CH_2COOR^{11}$; $R^9$ is a hydrocarbon group, a cyano group or a monovalent group represented by $-[CH(R^6)-CH(R^7)-O]_x-R^8$, $-[(CH_2)_y-O]_z-R^8$ or $-[CO-(CH_2)_y-O]_z-R^8$; $R^{10}$ is an alkyl group having 1 to 18 carbon atoms; $R^{11}$ is a hydrogen atom or an alkyl group having 1 to 5 carbon atoms;

the hydrocarbon group can have a substituent group;
m is an integer of 1 to 5; n and n' are each an integer of 5 to 200; x is an integer of 1 to 18; y is an integer of 1 to 5; and z is an integer of 1 to 18;

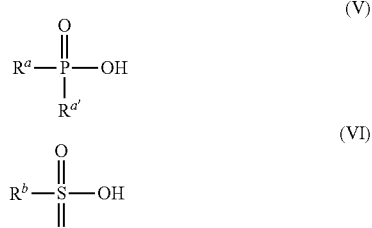

wherein $R^a$ and $R^{a'}$ are each independently a hydrogen atom, a hydroxyl group, a hydrocarbon group or a monovalent group represented by $-[CH(R^c)-CH(R^d)-O]_s-R^e$, $-[(CH_2)_t-O]_u-R^e$, or $-O-R^{a''}$; $R^{a'}$ is a hydrocarbon group or a monovalent group represented by $-[CH(R^c)-CH(R^d)-O]_s-R^e$, $-[(CH_2)_t-O]_u-R^e$, $-C(R^f)(R^g)-C(R^h)(R^i)-OH$ or $-CH_2-C(R^i)(R^k)-CH_2-OH$;

$R^b$ is a hydrocarbon group or a monovalent group represented by $-[CH(R^c)-CH(R^d)-O]_s-R^e$, $-[(CH_2)_t-O]_u-R^e$ or $-O-R^{b'}$; $R^{b'}$ is a hydrocarbon group or a monovalent group represented by $-[CH(R^c)-CH(R^d)-O]_s-R^e$ or $-[(CH_2)_t-O]_u-R^e$;

$R^c$ and $R^d$ are each independently a hydrogen atom or a methyl group; $R^e$ is a hydrogen atom, a hydrocarbon group or a monovalent group represented by $-CHO$, $-CH_2CHO$ or $-CH_2COOR^1$; $R^1$ is a hydrogen atom or an alkyl group having 1 to 5 carbon atoms; $R^f$, $R^g$, $R^h$, $R^i$, $R^j$ and $R^k$ are each independently a hydrogen atom, a hydrocarbon group or a group in which hydrocarbon groups are bound by at least one of an ether bond and an ester bond, and $R^f$ and $R^h$ can be bound to each other to form a cyclic structure; when the cyclic structure is formed, the cyclic structure can have a substituent group $R''$, and $R''$ is a hydrogen atom, a hydrocarbon group or a group in which hydrocarbon groups are bound by at least one of an ether bond and an ester bond;

the hydrocarbon group as $R^a$, $R^{a'}$ and $R^b$ can have a substituent group;

s is an integer of 1 to 18; t is an integer of 1 to 5; and u is an integer of 1 to 18.

In the present invention, the metal particle dispersibility and dispersion stability are increased by using, as the dispersant, a specific graft copolymer containing at least one constitutional unit represented by the general formula (I), which has a nitrogen site forming a salt with at least one selected from the group consisting of a halogenated hydrocarbon, a specific acidic phosphorus compound and a specific sulfonic acid compound. When a metal film is formed by baking the metal particle dispersion of the present invention, the dispersant is easily decomposed by heating upon the baking and is less likely to remain in the thus-obtained metal film. Therefore, desired functions such as electroconductivity are easily expressed. By using the dispersant, the viscosity of the metal particle dispersion can be decreased. Therefore, the metal particle dispersion of the present invention can be suitably used as an inkjet ink.

(Constitutional Unit Represented by the General Formula (I))

The graft copolymer used in the present invention has the constitutional unit represented by the general formula (I).

In the general formula (I), "A" is a direct bond or a divalent linking group. The direct bond means that, as shown in the following general formula (I-1), "Q" is directly bound to a carbon atom, not through a linking group:

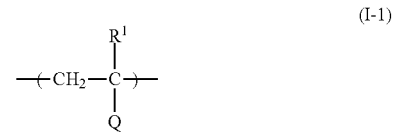

wherein $R^1$ and "Q" are the same as the general formula (i).

Examples of the divalent linking group as "A" include an alkylene group having 1 to 10 carbon atoms, an arylene group, a $-CONH-$ group, a $-COO-$ group, an ether group having 1 to 10 carbon atoms ($-R'-OR''-$ wherein $R'$ and $R''$ are each independently an alkylene group) and combinations thereof.

In the general formula (I), from the viewpoint of dispersibility, "A" is preferably a direct bond or a divalent linking group containing a $-CONH-$ group or a $-COO-$ group.

For example, when "A" is a divalent linking group containing a $-COO-$ group and "Q" is a group represented by the general formula (I-a), the constitutional unit represented by the general formula (I) can be a structure represented by the following formula (I-2), for example:

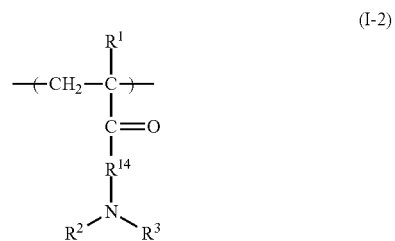

wherein $R^1$ is the same as the general formula (I); $R^2$ and $R^3$ are the same as the general formula (I-a); $R^{14}$ is an alkylene group having 1 to 8 carbon atoms, $-[CH(R^{15})-CH(R^{16})-O]_x-CH(R^{15})-CH(R^{16})-$ or $-[(CH_2)_y-O]_z-(CH_2)_y-$; $R^{15}$ and $R^{16}$ are each independently a hydrogen atom or a methyl group; x is an integer of 1 to 18; y is an integer of 1 to 5; and z is an integer of 1 to 18.

In the general formula (I-2), the alkylene group having 1 to 8 carbon atoms as $R^{14}$ can be linear or branched. Examples thereof include a methylene group, an ethylene group, a trimethylene group, a propylene group, various kinds of butylene groups, various kinds of pentylene groups, various kinds of hexylene groups and various kinds of octylene groups.

In the general formula (I-2), $R^{15}$ and $R^{16}$ are each independently a hydrogen atom or a methyl group.

Also, x is an integer of 1 to 18, preferably an integer of 1 to 4, more preferably an integer of 1 to 2; y is an integer of 1 to 5, preferably an integer of 1 to 4, more preferably 2 or 3; and z is an integer of 1 to 18, preferably an integer of 1 to 4, more preferably an integer of 1 to 2.

In the general formula (I-2), from the viewpoint of dispersibility, $R^{14}$ is preferably an alkylene group having 1 to 8 carbon atoms, more preferably a methylene group, an ethylene group, a propylene group or a butylene group, still more preferably a methylene group or an ethylene group.

In the general formula (I-a), examples of the hydrocarbon group which can contain a heteroatom as $R^2$ and $R^3$ include an alkyl group, an aralkyl group and an aryl group.

Examples of the alkyl group include a methyl group, an ethyl group, a propyl group, a butyl group, an isopropyl group, a tert-butyl group, a 2-ethylhexyl group, a cyclopentyl group and a cyclohexyl group. The alkyl group preferably has 1 to 18 carbon atoms. More preferably, the alkyl group is a methyl group or an ethyl group.

Examples of the aralkyl group include a benzyl group, phenethyl group, naphthylmethyl group and a biphenylmethyl group. The aralkyl group preferably has 7 to 20 carbon atoms, more preferably 7 to 14 carbon atoms.

Examples of the aryl group include a phenyl group, a biphenyl group, a naphthyl group, a tolyl group and a xylyl group. The aryl group preferably has 6 to 24 carbon atoms, more preferably 6 to 12 carbon atoms. The preferable number of carbon atoms does not include the number of the carbon atoms of the substituent group.

The hydrocarbon group containing a heteroatom has such a structure that the carbon atom in the hydrocarbon group is substituted with a heteroatom. Examples of the heteroatom which can be contained in the hydrocarbon group include an oxygen atom, a nitrogen atom, a sulfur atom and a silicon atom.

The hydrogen atom in the hydrocarbon group can be substituted with an alkyl group having 1 to 5 carbon atoms or a halogen atom such as a fluorine atom, a chlorine atom or a bromine atom.

"Q" can be a nitrogen-containing heterocyclic group which is able to form a salt and allowed to have a substituent group. Examples of the nitrogen-containing heterocyclic group include 5 to 7-membered nitrogen-containing monoheterocyclic rings and condensed rings thereof. It can further have a different heteroatom or a substituent group. The nitrogen-containing heterocyclic group can have aromaticity.

Concrete examples of nitrogen-containing heterocyclic compounds which are able to form the nitrogen-containing heterocyclic group include pyridine, piperidine, piperazine, morpholine, pyrrolidine, pyrroline, imidazole, pyrazole, triazole, tetrazole and benzimidazole. In particular, the nitrogen-containing heterocyclic compound is preferably a nitrogen-containing heterocyclic compound containing only a nitrogen atom as the heteroatom, such as pyridine, piperidine, piperazine or imidazole. It is more preferably a nitrogen-containing heterocyclic group with aromaticity, such as pyridine or imidazole.

Examples of the substituent group that the nitrogen-containing heterocyclic group can have include a linear, branched or cyclic alkyl group having 1 to 12 carbon atoms, an aralkyl group, an aryl group and a halogen atom such as F, Cl or Br. These examples can be used in combination. The substitution position of the substituent group and the number of the substituent group(s) are not particularly limited.

Examples of the constitutional unit represented by the general formula (I) include, but not limited to, constitutional units derived from: nitrogen-containing (meth)acrylates such as dimethylaminoethyl (meth) acrylate, dimethylaminopropyl (meth) acrylate, diethylaminoethyl (meth) acrylate, diethylaminopropyl (meth)acrylate and pentamethylpiperidyl (meth)acrylate; nitrogen-containing vinyl monomers such as vinylimidazole and vinylpyridine; and acrylamide-based monomers such as dimethylaminopropylacrylamide.

The constitutional unit represented by the general formula (I) is needed to function as a site with affinity for the metal particles and can be one kind of constitutional unit or a combination of two or more kinds of constitutional units.

(Constitutional Unit Represented by the General Formula (II))

The graft copolymer has the constitutional unit represented by the general formula (II), which contains a polymer chain at a side chain thereof. Therefore, excellent solvent affinity can be obtained, and excellent metal particle dispersibility and dispersion stability can be obtained.

In the general formula (II), "L" is a direct bond or a divalent linking group. The divalent linking group as "L" is not particularly limited, as long as it is able to link the ethylenically unsaturated double bond and the polymer chain to each other. Examples of the divalent linking group as "L" include an alkylene group, an alkylene group having a hydroxyl group, an arylene group, a —CONH— group, a —COO— group, a —NHCOO— group, an ether group (—O— group), a thioether group (—S— group) and combinations thereof. In the present invention, the binding direction of the divalent linking group can be any direction. For example, when —CONH— is contained in the divalent linking group, —CO can be located on the carbon atom side of the main chain and —NH can be located on the polymer chain side of the side chain. To the contrary, —NH can be located on the carbon atom side of the main chain and —CO can be located on the polymer chain side of the side chain.

In the general formula (II), "Polymer" is a polymer chain having at least one constitutional unit represented by the general formula (III) or (IV).

In the general formula (III), $R^4$ is a hydrogen atom or a methyl group, and $R^5$ is a hydrocarbon group, a cyano group or a monovalent group represented by $-[CH(R^6)-CH(R^7)-O]_x-R^8$, $-[(CH_2)_y-O]_z-R^8$, $-[CO-(CH_2)_y-O]_z-R^8$, $-CO-O-R^9$ or $-O-CO-R^{10}$.

The hydrocarbon group as $R^5$ is preferably an alkyl group having 1 to 18 carbon atoms, an alkenyl group having 2 to 18 carbon atoms, an aralkyl group or an aryl group.

The alkyl group having 1 to 18 carbon atoms can be linear, branched or cyclic. Examples thereof include a methyl group, an ethyl group, an n-propyl group, an isopropyl group, an n-butyl group, a 2-ethylhexyl group, a 2-ethoxyethyl group, a cyclopentyl group, a cyclohexyl group, a bornyl group, an isobornyl group, a dicyclopentanyl group, an adamantyl group, and a lower alkyl group-substituted adamantyl group.

The alkenyl group having 2 to 18 carbon atoms can be linear, branched or cyclic. Examples of such an alkenyl group include a vinyl group, an allyl group and a propenyl group. The position of the double bond of the alkenyl group is not limited. From the viewpoint of the reactivity of the resulting polymer, the double bond is preferably located at the terminal of the alkenyl group.

Examples of the aryl group as $R^5$ include a phenyl group, a biphenyl group, a naphthyl group, a tolyl group and a xylyl group. The aryl group preferably has 6 to 24 carbon atoms, more preferably 6 to 12 carbon atoms.

Examples of the aralkyl group as $R^5$ include a benzyl group, a phenethyl group, a naphthylmethyl group and a biphenylmethyl group. The aralkyl group preferably has 7 to 20 carbon atoms, more preferably 7 to 14 carbon atoms.

$R^8$ is a hydrogen atom, an alkyl group having 1 to 18 carbon atoms, an aralkyl group, an aryl group or a monovalent group represented by —CHO, —CH$_2$CHO or —CH$_2$COOR$^{11}$. $R^9$ is an alkyl group having 1 to 18 carbon atoms, an aralkyl group, an aryl group, a cyano group or a monovalent group represented by $-[CH(R^6)-CH(R^7)-O]_x-R^8$, $-[(CH_2)_y-O]_z-R^8$ or $-[CO-(CH_2)_y-O]_z-$ $R^8$. $R^{10}$ is an alkyl group having 1 to 18 carbon atoms. $R^{11}$ is a hydrogen atom or an alkyl group having 1 to 5 carbon atoms.

The alkyl group having 1 to 18 carbon atoms, the aralkyl group and the aryl group as $R^8$ and $R^9$ are as described above in the description of $R^5$.

The alkyl group as $R^{10}$ and $R^{11}$ is as described above in the description of $R^5$.

When $R^5$, $R^8$, $R^9$ and $R^{10}$ are each a group having an aromatic ring, the aromatic ring can further have a substituent group. Examples of the substituent group include a linear, branched or cyclic alkyl group having 1 to 5 carbon atoms, an alkenyl group, a nitro group and a halogen atom such as F, Cl or Br.

The preferable number of carbon atoms does not include the number of the carbon atoms of the substituent group.

In $R^5$ and $R^9$, x, y and z are as described above in the description of "A".

Also, $R^5$, $R^8$, $R^9$ and $R^{10}$ can be further substituted with a substituent group such as an alkoxy group, a hydroxyl group, a carboxyl group, an amino group, an epoxy group, an isocyanate group or a hydrogen bond-forming group, to the extent that does not deteriorate the dispersing performance or the like of the graft copolymer. Also, after synthesizing the graft copolymer having such a substituent group, a polymerizable group can be added thereto by reaction with a compound having a functional group that is reactive with the substituent group and the polymerizable group. For example, a polymerizable group can be added by reacting the graft copolymer having a carboxyl group with glycidyl (meth)acrylate, or reacting the graft copolymer having an isocyanate group with hydroxyethyl (meth)acrylate.

Of the above-mentioned constitutional units, the polymer chain contained in the constitutional unit represented by the general formula (II) preferably has a constitutional unit derived from, but not limited to, methyl (meth)acrylate, ethyl (meth)acrylate, isopropyl (meth)acrylate, n-butyl (meth) acrylate, isobutyl (meth) acrylate, tert-butyl (meth) acrylate, 2-ethylhexyl (meth)acrylate, 2-ethoxyethyl (meth) acrylate, cyclohexyl (meth)acrylate, benzyl (meth)acrylate, phenyl (meth)acrylate, isobornyl (meth)acrylate, dicyclopentanyl (meth) acrylate, adamantyl (meth) acrylate, styrene, α-methylstyrene, vinylcyclohexane, etc.

In the general formula (IV), m is an integer of 1 to 5, preferably an integer of 2 to 5, more preferably an integer of 4 or 5. The unit numbers n and n' of the constitutional unit of the polymer chain can be each an integer of 5 to 200 and are not particularly limited. However, they are preferably in a range of 5 to 100.

In the present invention, as $R^5$ and $R^9$, it is preferable to use a group that has excellent solubility in the below-described solvent, and they can be appropriately selected depending on the solvent used for the metal particle dispersion. In particular, for example, when the solvent used is a solvent that is generally used for metal particle dispersions, such as an ether alcohol acetate-based solvent, an ether-based solvent or an ester-based solvent, preferred as $R^5$ and $R^9$ are a methyl group, an ethyl group, an isobutyl group, an n-butyl group, a 2-ethylhexyl group, a benzyl group, etc.

The reason why $R^5$ and $R^9$ are determined in this way is that particularly excellent metal particle dispersibility and dispersion stability can be obtained when the constitutional unit containing $R^5$ or $R^9$ has solubility in the solvent and the salt-forming site formed by the basic site of the monomer has high adsorption properties to metal particles.

It is preferable that $R^5$ and $R^9$ are appropriately selected depending on the intended use of the metal particle dispersion. For example, when the metal particle dispersion is baked and used, a branched alkyl group (e.g., isopropyl, isobutyl, 2-ethylhexyl), a methyl group, an n-butyl group, etc., are preferred as $R^5$ and $R^9$, which are groups that can be easily thermally-decomposed. When the metal particle dispersion is baked and used, the branched alkyl group is preferably a branched alkyl group having 3 to 18 carbon atoms, more preferably a branched alkyl group having 3 to 8 carbon atoms.

Also, for example, when the metal particle dispersion is used for a functional film with heat ray shielding properties, etc., an alicyclic alkyl group (e.g., cyclohexyl, isobornyl, adamantyl) and the like are preferred as $R^5$ and $R^9$, from the viewpoint of transparency, heat resistance, etc.

Also, when the metal particle dispersion is used for a resin molded product containing the metal particle dispersion, the dispersant preferably has a structure that is similar to the structure of the resin to be used in combination. For example, in the case of using polymethyl methacrylate, a methyl group or the like is preferred as $R^5$ and $R^9$.

The mass average molecular weight Mw of the polymer chain as the Polymer is preferably in a range of 500 to 15,000, more preferably in a range of 1,000 to 8,000. When the mass average molecular weight is in the range, the dispersant can keep a sufficient steric repulsion effect, and an increase in the time required to disperse the metal particles can be inhibited by the steric effect.

As an indication, it is preferable that the polymer chain as the "Polymer" has a solubility of 50 (g/100 g solvent) or more at 23° C., in the solvent used in combination.

The solubility of the polymer chain can be determined by whether or not the material which is used for introducing the polymer chain when preparing the graft copolymer has the above solubility. For example, when a polymerizable oligomer containing a polymer chain and a group having an ethylenically unsaturated double bond at a terminal of the chain is used for introducing a polymer chain into the graft copolymer, the polymerizable oligomer is needed to have the above solubility. When a copolymer is formed by monomers each containing a group having an ethylenically unsaturated double bond, and then a polymer chain is introduced into the graft copolymer by a polymer chain having a reactive group that is reactive with the reactive group contained in the copolymer, the polymer chain having the reactive group is needed to have the solubility.

The polymer chain can be a homopolymer or copolymer. In the graft copolymer, the polymer chain contained in the constitutional unit represented by the general formula (II) can be one kind of polymer chain or a combination of two or more kinds of polymer chains.

In the graft copolymer, the content of the constitutional unit represented by the general formula (I) and having the nitrogen site, is preferably 3 to 80% by mass, more preferably 5 to 50% by mass, still more preferably 10 to 40% by mass. When the content of the constitutional unit having the nitrogen site in the graft copolymer is in the range, in the graft copolymer, the balance between the adsorbing properties of the salt-forming site to metal particles and the solubility of the polymer chain in the solvent can be appropriate, and excellent dispersibility and dispersion stability can be obtained.

The content ratios of the constitutional units can be calculated from the amounts of the constitutional units used to synthesize the graft copolymer having the constitutional unit represented by the general formula (I).

The mass average molecular weight Mw of the graft copolymer is preferably in a range of 1,000 to 100,000, more preferably in a range of 3,000 to 30,000, still more preferably in a range of 5,000 to 20,000. The metal particles can be uniformly dispersed when the weight average molecular weight is in the range.

The mass average molecular weight Mw is a value measured by gel permeation chromatography (GPC). The measurement was carried out by using HLC-8120GPC manufactured by Tosoh Corporation and the following: the elution solvent used is N-methylpyrrolidone mixed with 0.01 mol/l lithium bromide; the polystyrene standards for calibration curve used are Mw 377400, 210500, 96000, 50400, 20650, 10850, 5460, 2930, 1300 and 580 (the Easi PS-2 series manufactured by Polymer Laboratories) and Mw 1090000 (manufactured by Tosoh Corporation); and the measurement columns used are two TSK-GEL ALPHA-M columns (manufactured by Tosoh Corporation).

In the present invention, the method for producing the graft copolymer is not particularly limited, as long as it is a method that is able to produce a graft copolymer having the constitutional unit represented by the general formula (I) and the constitutional unit represented by the general formula (II). For example, there may be mentioned a method for producing a graft copolymer by copolymerizing at least a nitrogen-containing monomer represented by the following general formula (I'), and a polymerizable oligomer comprising a polymer chain having at least one constitutional unit represented by the general formula (III) or (IV) and a group having an ethylenically unsaturated double bond at a terminal of the chain, which are contained as copolymerizable components. The graft copolymer can be produced by further using other monomer as needed, and by using a known polymerization method.

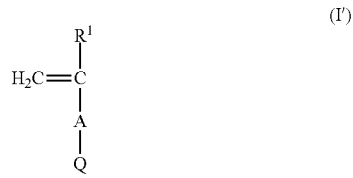

(I')

In the general formula (I'), $R^1$, "A" and "Q" are the same as the general formula (I).

Also, after a copolymer is formed by addition polymerization of the nitrogen-containing monomer represented by the general formula (I') and a monomer containing a reactive group and a group having an ethylenically unsaturated double bond, a polymer chain can be introduced into the copolymer by using a polymer chain containing a reactive group that is reactive with the reactive group contained in the copolymer. In particular, for example, after a copolymer having a substituent group such as an alkoxy group, a hydroxyl group, a carboxyl group, an amino group, an epoxy group, an isocyanate group or a hydrogen bond-forming group is synthesized, a polymer chain can be introduced into the copolymer by reacting the substituent group with a polymer chain containing a functional group that is reactive with the substituent group.

For example, a polymer chain can be introduced by reacting a copolymer having a carboxyl group at a side chain thereof with a polymer chain having a glycidyl group at the terminal thereof, or by reacting a copolymer having an isocyanate group at a side chain thereof with a polymer chain having a hydroxy group at the terminal thereof.

In the polymerization, additives that are generally used for polymerization, such as a polymerization initiator, a dispersion stabilizer and a chain transfer agent, can be used.
(Halogenated Hydrocarbon, Acidic Phosphorus Compound, Sulfonic Acid Compound)

The dispersant of the present invention is a graft copolymer in which at least part of nitrogen sites of the constitutional units represented by the general formula (I) each form a salt with at least one selected from the group consisting of a halogenated hydrocarbon, an acidic phosphorus compound represented by the general formula (V), and a sulfonic acid compound represented by the general formula (VI).

In the present invention, by using at least one selected from the group consisting of a halogenated hydrocarbon, the acidic phosphorus compound represented by the following general formula (V) and the sulfonic acid compound represented by the following general formula (VI) as a salt-forming agent, the dispersant can be a dispersant which has excellent metal particle dispersibility and dispersion stability and, in the case of forming a metal film by baking the metal particle dispersion of the present invention, which can be easily volatilized or decomposed when baked.

As the halogenated hydrocarbon, there may be mentioned one in which any one of a chlorine atom, a bromine atom and an iodine atom (halogen atoms) is substituted with a hydrogen atom of a saturated or unsaturated linear, branched or cyclic hydrocarbon.

Also, the halogenated hydrocarbon preferably has 1 to 30 carbon atoms, more preferably 1 to 25 carbon atoms, still more preferably 1 to 18 carbon atoms.

The halogenated hydrocarbon can be a halogenated alkyl which has, but not limited to, 1 to 18 carbon atoms. Concrete examples thereof include methyl chloride, methyl bromide, ethyl chloride, ethyl bromide, methyl iodide, ethyl iodide, n-butyl chloride, hexyl chloride, octyl chloride, dodecyl chloride, tetradecyl chloride and hexadecyl chloride. Also, the halogenated hydrocarbon can be a halogenated allyl such as allyl chloride, allyl bromide and allyl iodide. Also, the halogenated hydrocarbon can be a halogenated aralkyl. The aralkyl group of the halogenated aralkyl can be an aralkyl group which has, but not limited to, 7 to 18 carbon atoms. Concrete examples thereof include benzyl chloride, benzyl bromide, benzyl iodide, naphthylmethyl chloride, pyridylmethyl chloride, naphthylmethyl bromide and pyridylmethyl bromide. Also, the halogenated hydrocarbon can be a halogenated aryl. Examples thereof include, but not limited to, a halogenated aryl having 6 to 18 carbon atoms. Concrete examples thereof include benzene chloride.

Of them, the halogenated hydrocarbon is preferably at least one of the halogenated allyl and the halogenated aralkyl, more preferably the halogenated allyl, from the viewpoint of increasing metal particle dispersibility.

The halogenated hydrocarbon is particularly preferably at least one selected from the group consisting of allyl chloride, allyl bromide, allyl iodide, benzyl chloride, benzyl bromide and benzyl iodide, from the point of view that a salt-forming reaction is easy to occur and the resulting salt-forming site has excellent adsorption properties to the metal particles.

The acidic phosphorus compound used in the present invention is a compound represented by the general formula (V), and the sulfonic acid compound is a compound represented by the general formula (VI).

In the general formulae (V) and (VI), the hydrocarbon group as $R^a$, $R^{a\prime}$, $R^{a\prime\prime}$, $R^b$ and $R^{b\prime}$ and $R^e$ is preferably an alkyl group having 1 to 18 carbon atoms, an alkenyl group having 2 to 18 carbon atoms, an aralkyl group or an aryl group. The alkyl group having 1 to 18 carbon atoms, the aralkyl group and the aryl group can be same as those described above in the description of $R^5$ of the general formula (III).

In the general formulae (V) and (VI), the hydrocarbon group as $R^f$, $R^g$, $R^h$, $R^i$, $R^j$, $R^k$, $R^l$ and $R^n$ is preferably an alkyl group having 1 to 18 carbon atoms, an alkenyl group having 2 to 18 carbon atoms, an aralkyl group or an aryl group. The alkyl group having 1 to 18 carbon atoms, the aralkyl group and the aryl group can be also the same as those described above in the description of $R^5$ of the general formula (III).

In particular, an alkyl group having 1 to 8 carbon atoms, an aralkyl group having 7 to 11 carbon atoms, and an aryl group having 6 to 12 carbon atoms are preferably used, from the point of view that excellent metal particle dispersibility can be obtained, and organic components are less likely to remain after the metal particle dispersion is baked.

In $R^a$, $R^{a\prime}$, $R^{a\prime\prime}$, $R^b$ and $R^{b\prime}$, s is an integer of 1 to 18; t is an integer of 1 to 5; and u is an integer of 1 to 18. Also, s is preferably an integer of 1 to 4, more preferably an integer of 1 to 2; t is preferably an integer of 1 to 4, more preferably or 3; and u is preferably an integer of 1 to 4, more preferably an integer of 1 to 2.

The group in which hydrocarbon groups are bound by at least one of an ether bond and an ester bond, as $R^f$, $R^g$, $R^h$, $R^i$, $R^j$, $R^k$ and $R^n$, is a group represented by —R'—O—R", —R'—(C=O)—O—R" or —R'—O—(C=O)—R" (wherein R' and R" are each a hydrocarbon group or a group in which hydrocarbon groups are bound by at least one of an ether bond and an ester bond). Two or more ether bonds and ester bonds can be contained per group.

When the hydrocarbon groups are bound by at least one of an ether bond and an ester bond, at least one of the hydrocarbon groups becomes a divalent hydrocarbon group. In this case, the alkyl group having 1 to 18 carbon atoms, the aralkyl group and the aryl group become an alkylene group, an arylene group and a divalent group which is a combination thereof, respectively.

In specific, the general formula (V) in which $R^f$ and $R^h$ can be bound to each other to form a cyclic structure is represented by the following general formula (V-1):

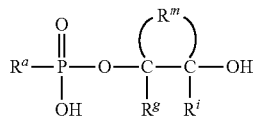

(V-1)

wherein $R^a$, $R^g$ and $R^i$ are the same as those described above in the description of the general formula (V); and $R^m$ is a group in which $R^f$ and $R^h$ are bound to each other, and $R^m$ can further have a substituent group $R^n$.

When $R^f$ and $R^h$ are bound to each other to form a cyclic structure, the number of carbon atoms forming the cyclic structure is preferably 5 to 8. The number is more preferably 6, that is, the cyclic structure is more preferably a 6-membered ring structure.

The above-mentioned —C($R^f$)($R^g$)—C($R^h$)($R^i$)—OH or —CH$_2$—C($R^j$)($R^k$)—CH$_2$—OH can be obtained by, for example, reacting an acidic group (OH) of a phosphate group with a monofunctional epoxy compound or a monofunctional oxetane compound.

When the metal particle dispersion is used to form a metal film by baking, it is preferable that at least one of $R^a$ and $R^{a\prime\prime}$ of the acidic phosphorus compound represented by the general formula (V) is at least one of a hydrogen atom and a hydroxyl group, from the point of view that excellent metal particle dispersibility can be obtained and the resistance of the metal film can be decreased.

The halogenated hydrocarbon, the acidic phosphorus compound represented by the following general formula (V) and the sulfonic acid compound represented by the following general formula (VI) can be used alone or in combination of two or more.

In the dispersant used in the present invention, the content of at least one of the halogenated hydrocarbon, the acidic phosphorus compound represented by the general formula (V) and the sulfonic acid compound represented by the general formula (VI) is not particularly limited, as long as excellent dispersion stability can be obtained. In general, with respect to the nitrogen site contained in the constitutional unit represented by the general formula (I), the content is about 0.05 to 2.0 molar equivalent, preferably 0.1 to 1.0 molar equivalent, more preferably 0.2 to 0.8 molar equivalent, from the viewpoint of increasing metal particle dispersion stability.

(Production of Dispersant)

The method for producing a salt-type dispersant which is used as the dispersant in the present invention is not particularly limited, as long as it is a method that is able to produce a graft copolymer in which at least part of nitrogen sites of the constitutional units represented by the general formula (I) each form a salt with at least one selected from the group consisting of the halogenated hydrocarbon, the acidic phosphorus compound represented by the general formula (V) and the sulfonic acid compound represented by the general formula (VI). For example, the salt-type dispersant can be produced as follows: the above-obtained graft copolymer is dissolved or dispersed in the below-described solvent, and then at least one of the halogenated hydrocarbon, the acidic phosphorus compound represented by the general formula (V) and the sulfonic acid compound represented by the general formula (VI) is added to the solvent, followed by stirring and, as needed, heating the mixture, thereby producing the salt-type dispersant.

In the metal particle dispersion of the present invention, the graft copolymer can be used alone as the dispersant, or two or more kinds of the graft copolymers can be used in combination as the dispersant. The content is appropriately determined depending on the type and so on of the metal particles used. With respect to 100 parts by mass of the metal particles, the content is generally in a range of 1 to 200 parts by mass, preferably 3 to 100 parts by mass, more preferably 5 to 80 parts by mass. When the content of the dispersant is in the range, the metal particles can be uniformly dispersed, and excellent dispersion stability can be obtained.

<Solvent>

In the metal particle dispersion of the present invention, the solvent is not particularly limited, as long as it is not reactive with the components in the metal particle dispersion and it is able to dissolve or disperse them. Concrete examples thereof include the following organic solvents: alcohol-based organic solvents such as methyl alcohol, ethyl alcohol, N-propyl alcohol and isopropyl alcohol; ether alcohol-based organic solvents such as methoxy alcohol, ethoxy alcohol, methoxy ethoxy ethanol, ethoxy ethoxy ethanol and propylene glycol monomethyl ether; ester-based organic solvents such as ethyl acetate, butyl acetate, 3-methoxybutyl acetate, methyl methoxypropionate, ethyl ethoxypropionate and ethyl lactate; ketone-based organic solvents such as acetone, methyl ethyl ketone, methyl isobutyl ketone and cyclohexanone; ether alcohol acetate-based organic solvents such as methoxy ethyl acetate, methoxy propyl acetate, methoxy butyl acetate, ethoxy ethyl acetate, ethyl cellosolve acetate, methoxy ethoxy ethyl acetate, propylene glycol monomethyl ether acetate, diethylene glycol monobutyl ether acetate and diethylene glycol monoethyl ether acetate; ether-based organic solvents such as diethyl ether, ethylene glycol dimethyl ether, diethylene glycol dimethyl ether, diethylene glycol methyl ethyl ether and tetrahydrofuran; aprotic amide-based organic solvents such as N,N-dimethylformamide, N,N-dimethylacetamide and N-methylpyrrolidone; lactone-based organic solvents such as γ-butyrolactone; unsaturated hydrocarbon-based organic solvents such as benzene, toluene, xylene and naphthalene; and saturated hydrocarbon-based organic solvents such as n-heptane, n-hexane and n-octane.

Of them, the following are preferably used: ketone-based organic solvents such as methyl ethyl ketone, methyl isobutyl ketone and cyclohexanone; ether alcohol-based organic solvents such as propylene glycol monomethyl ether; ether alcohol acetate-based organic solvents such as methoxy ethyl acetate, ethoxy ethyl acetate, ethyl cellosolve acetate, methoxy ethoxy ethyl acetate, ethoxy ethoxy ethyl acetate and propylene glycol monomethyl ether acetate; ether-based organic solvents such as ethylene glycol dimethyl ether, diethylene glycol dimethyl ether, diethylene glycol methyl ethyl ether and propylene glycol diethyl ether; and ester-based organic solvents such as 3-methoxybutyl acetate, methyl methoxypropionate, ethyl ethoxypropionate and ethyl lactate.

Of them, from the viewpoint of the solubility of the dispersant and coating properties, the following are particularly preferred as the solvent used in the present invention: MEK (methyl ethyl ketone), MIBK (methyl isobutyl ketone), MBA (3-methoxybutyl acetate), PGMEA (propylene glycol monomethyl ether acetate), DMDG (diethylene glycol dimethyl ether), BCA (diethylene glycol monobutyl ether acetate), diethylene glycol monoethyl ether acetate, diethylene glycol methyl ethyl ether, PGME (propylene glycol monomethyl ether) and mixtures thereof.

In the metal particle dispersion of the present invention, the content of the solvent is not particularly limited, as long as the components of the metal particle dispersion can be uniformly dissolved or dispersed. In the present invention, the solid content of the metal particle dispersion is preferably in a range of 5 to 70% by mass, more preferably in a range of 10 to 50% by mass. When the solid content is in the range, a viscosity suitable for coating can be obtained.

<Other Components>

As needed, the metal particle dispersion of the present invention can contain other components, as long as the effect of the present invention is not deteriorated.

Examples of such components include a complexing agent, a protective colloid, a reducing agent, a surfactant for increasing wettability, a silane coupling agent for increasing adhesion, a defoaming agent, a cissing inhibitor, an antioxidant, an aggregation inhibitor and a UV absorbing agent.

<Method for Producing a Metal Particle Dispersion>

In the present invention, the method for producing a metal particle dispersion is not particularly limited, as long as it is a method that is able to sufficiently disperse metal particles, and the method can be appropriately selected from conventionally known methods. In particular, for example, a metal particle dispersion can be prepared by mixing the dispersant with the solvent, stirring the mixture to prepare a dispersant solution, mixing metal particles and, as needed, other components with the dispersant solution, and then dispersing the mixture with a conventionally known stirrer or disperser.

<Applications of the Metal Particle Dispersion>

Because the metal particle dispersion of the present invention has excellent dispersibility and dispersion stability and inhibits the precipitation of the metal particles, it can be suitably used in conventionally known applications. For example, the metal particle dispersion of the present invention can be used in electroconductive materials, metallic luster imparting materials, antimicrobial materials, heat lay shielding property imparting materials, antistatic property imparting materials, fluorescent materials, etc. Also, the metal particle dispersion of the present invention can be particularly suitably used for the purpose of forming a metal film by baking, because, even when the metal particle dispersion of the present invention is baked at lower temperature than ever before, less organic components remain in the thus-obtained metal film.

[Article]

The article of the present invention comprises a coating film, molded product or sintered film of the metal particle dispersion of the present invention or of a composition containing the metal particle dispersion of the present invention.

By using the metal particle dispersion of the present invention with excellent dispersibility, the article of the present invention can be a high-quality article comprising a uniform coating film or molded product with less aggregation or less uneven distribution of the metal particles. When the metal particle dispersion of the present invention or the composition containing the metal particle dispersion of the present invention is formed into a sintered film by baking, a high-quality article comprising the metal film with less organic components remaining therein can be obtained.

As the article comprising a coating film of the metal particle dispersion of the present invention or of the composition containing the metal particle dispersion of the present invention, typically, there may be mentioned an embodiment comprising a base material that serves as the support for the coating film. An example of such an embodiment is an article that is in the form of a substrate in which at least a coating film of the metal particle dispersion of the present invention or of the composition containing the metal particle dispersion of the present invention is disposed on a base material. The coating film of the composition containing the metal particle dispersion encompasses a cured coating film, such as the case where the composition contains a photocurable and/or thermosetting resin.

As the article comprising a sintered film of the metal particle dispersion of the present invention or of the composition containing the metal particle dispersion of the present invention, typically, there may be mentioned an embodiment comprising a base material that servers as the support for the sintered film.

The coating film and the sintered film can be not only a continuous layer but also an island-shaped discontinuous layer, which encompasses a state where the metal particles are discontinuously carried on a base material of some kind.

Hereinafter, the article of the present invention in the embodiments of such substrates, will be described by reference to figures.

FIG. 1 is a schematic view of an example of the article of the present invention. An article 100 shown in FIG. 1 comprises a base material 1 and a sintered film 2 formed thereon by baking the metal particle dispersion or the composition containing the metal particle dispersion.

Figure 2:
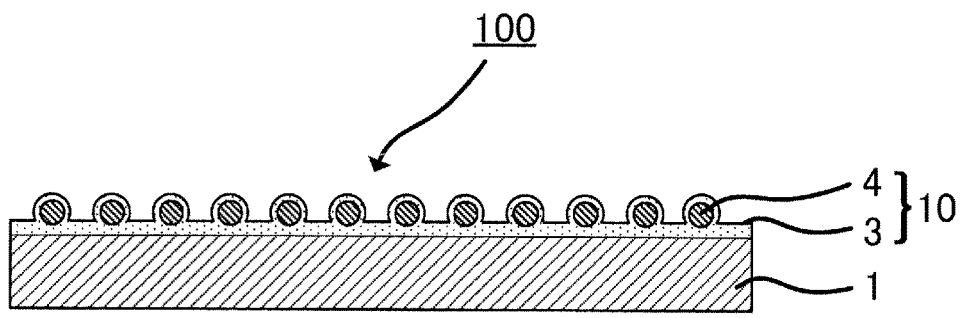
FIG. 2 is a schematic view of a different example of the article of the present invention.

FIG. 2 is a schematic view of a different example of the article of the present invention. An article 100 shown in FIG. 2 comprises a base material 1 and a coating film 10 formed thereon, in which metal particles 4 are supported by a thin film 3.

Figure 3:
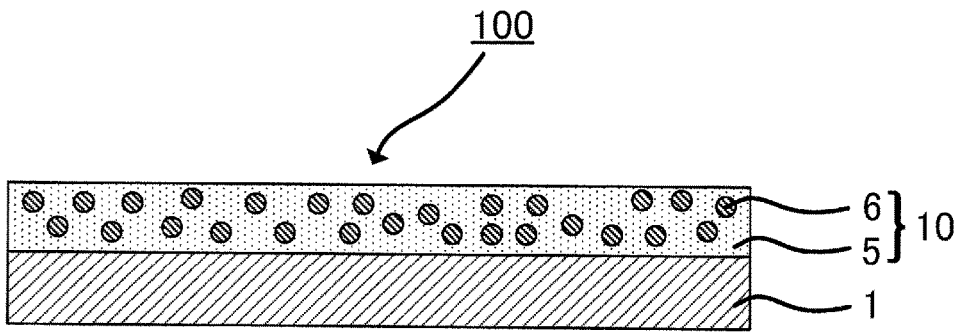
FIG. 3 is a schematic view of a different example of the article of the present invention.

FIG. 3 is a schematic view of a different example of the article of the present invention. An article 100 shown in FIG. 3 comprises a base material 1 and a coating film 10 formed thereon, in which metal particles 6 are contained in a matrix 5.

The base material of the above embodiments can be appropriately selected from conventionally known base materials, depending on the intended use, and is not particularly limited. Examples thereof include a resin base material and a glass base material. As the base material that serves as the support for the sintered film, a glass base material is preferably used. In addition, because the metal particle dispersion of the present invention can be sintered at lower temperature than ever before, a resin base material, which has been difficult to use for forming a sintered film, can be suitably used. The resin base material is particularly preferably a base material with excellent heat resistance, and concrete examples thereof include base materials of polyimide resin, polyamide resin, etc.

The shape of the base material can be appropriately selected depending on the intended use. It can be a flat plate shape or curved surface shape. In the case of using the base material in a flat plate shape, the thickness of the base material can be appropriately determined depending on the intended use. For example, it can be about 25 μm to 100 mm.

Examples of the article comprising a coating film of the metal particle dispersion of the present invention or of the composition containing the metal particle dispersion of the present invention include, but not limited to, a heat ray shielding film and an antistatic film.

Examples of the article comprising a sintered film of the metal particle dispersion of the present invention or of the composition containing the metal particle dispersion of the present invention, that is, a sintered film comprising a baked coating film of the metal particle dispersion or of the composition containing the metal particle dispersion include, but not limited to, a circuit board, an electroconductive film, an electrode and a photoelectric conversion semiconductor film.

Structures other than the coating film or sintered film of the articles can be appropriately selected and used from conventionally known structures.

As the article comprising a molded product of the metal particle dispersion or of the composition containing the metal particle dispersion, typically, there may be mentioned an embodiment in which a base material that serves as the support is not contained.

For example, there may be mentioned resin molded products and resin fibers, in each of which the metal particle dispersion is contained as an antimicrobial agent, color material, reinforcing material, etc., and antimicrobial articles and designing articles.

Structural components contained in the composition containing the metal particle dispersion are, for example, those that can serve as the thin film 3 or matrix 5 of the coating film 10, or the matrix of the molded product. They can be appropriately selected and used from known structural components.

Examples of the structural components contained in the composition containing the metal particle dispersion include an acrylic (co)polymer. Concrete examples thereof include a polymer or copolymer obtained by polymerizing one or more monomers selected from the group consisting of methyl (meth)acrylate, ethyl (meth)acrylate, n-propyl (meth)acrylate, isopropyl (meth)acrylate, n-butyl (meth) acrylate, sec-butyl (meth) acrylate, isobutyl (meth) acrylate, tert-butyl (meth)acrylate, n-pentyl (meth)acrylate, n-hexyl (meth)acrylate, 2-ethylhexyl (meth)acrylate, benzyl (meth) acrylate, cyclohexyl (meth)acrylate, styrene, 2-hydroxyethyl (meth)acrylate, 2-dimethylaminoethyl (meth)acrylate and (meth)acrylic acid.

For the purpose of forming the sintered film, preferred is an acrylic (co)polymer obtained by polymerizing polymerizable components including a monomer having a branched alkyl group, such as isopropyl methacrylate, isobutyl methacrylate or 2-ethylhexyl methacrylate. From the viewpoint of dispersibility, more preferred is an acrylic copolymer obtained by polymerizing polymerizable components including the monomer having the branched alkyl group and a monomer having an acid number, such as methacrylic acid.

They are just examples, and the structural components contained in the composition containing the metal particle dispersion can be appropriately selected from known structural components and are not limited to the above examples.

In each article, the structures and structural components other than the coating film, molded product or sintered film of the metal particle dispersion of the present invention or of the composition containing the metal particle dispersion of the present invention, can be appropriately selected and used from known structures and structural components.

In particular, in the case of the heat ray shielding film, there may be mentioned a structure in which a cured film of the composition containing the metal particle dispersion of the present invention and a photocurable resin is disposed on a base material such as a resin base material. The resin base material and the photocurable resin can be appropriately selected from resin base materials and photocurable resins that have been used in heat-ray shielding films.

<Method for Producing the Article>

The article can be obtained by, for example, forming a coating film by applying the metal particle dispersion or the composition containing the metal particle dispersion onto the base material or a functional layer on the base material. As needed, the coating film can be baked to form a sintered film.

The method for producing a sintered film according to the present invention comprises the steps of forming a coating film by applying, onto a base material, a composition (coating solution) which contains the metal particle dispersion for forming a sintered film and baking the coating film.

The method of applying the metal particle dispersion or the composition containing the metal particle dispersion can be appropriately selected from conventionally known methods. For example, there may be mentioned methods such as gravure printing, screen printing, spray coating, die coating, spin coating, comma coating, bar coating, knife coating, offset printing, flexographic printing, inkjet printing and dispenser printing. Of them, from the point of view that fine patterning can be carried out, preferred are gravure printing, flexographic printing, screen printing and inkjet printing. Particularly, because the metal particle dispersion of the present invention has excellent dispersibility, it prevents discharge nozzles for inkjet from clogging and from causing discharge bending. Therefore, the metal particle dispersion of the present invention is suitable for inkjet printing.

The resulting coating film can be dried by a conventionally known method. The thickness of the film after drying can be appropriately adjusted, depending on the intended use. The thickness is generally in a range of 0.01 to 100 µm, preferably in a range of 0.1 to 50 µm.

When the coating film is baked to form a sintered film, a conventionally known baking method can be used. For example, there may be mentioned a method of baking the coating film by increasing the temperature of the film to a temperature at which the metal particles are baked, and a method of baking the coating film by surface wave plasma generated by applying microwave energy.

The method for producing the molded product of the composition containing the metal particle dispersion can be appropriately selected from conventionally known methods. For instance, examples of molding methods in the case of using a resin as a matrix, include injection molding, blow molding, vacuum molding and pressure molding.

EXAMPLES

Hereinafter, the present invention will be described in detail, by way of examples. The scope of the present invention is not limited by the examples.

Synthesis Example 1

Production of Copper Particles

First, 64 g of copper(II) oxide and 5.1 g of gelatin were added to 650 mL of pure water and mixed to prepare a mixed solution. The pH of the mixed solution was adjusted to 10 by using 15% ammonia water. Then, the temperature of the mixed solution was increased from room temperature to 90° C. for 20 minutes. After increasing the temperature, with stirring the mixed solution, a solution obtained by mixing 6.4 g of 1% mercaptoacetic acid solution and 75 g of 80% hydrazine monohydrate, which function as a complexing agent, with 150 mL of pure water, was added to the mixed solution and reacted with the copper(II) oxide for one hour, thereby producing copper particles. Then, the copper particles were washed by filtration and dried, thereby obtaining the copper particles of Synthesis Example 1. The copper particles were observed with a scanning transmission electron microscope (STEM) and found to have an average primary particle diameter of 50 nm.

Synthesis Example 2

Synthesis of Macromonomer MM-1

First, 80.0 parts by mass of propylene glycol monomethyl ether acetate (PGMEA) was put in a reactor equipped with a cooling tube, an addition funnel, a nitrogen inlet, a mechanical stirrer and a digital thermometer and heated to 90° C. with stirring under a nitrogen flow. A mixed solution of 50.0 parts by mass of methyl methacrylate, 15.0 parts by mass of n-butyl methacrylate, 15.0 parts by mass of benzyl methacrylate, 20.0 parts by mass of 2-ethoxyethyl methacrylate, 4.0 parts by mass of mercaptoethanol, 30 parts by mass of PGMEA and 1.0 part by mass of α,α'-azobisisobutyronitrile (AIBN) was added thereto in a dropwise manner for 1.5 hours, and the mixture was reacted for 3 hours. Next, the nitrogen flow was stopped and the reaction solution was cooled to 80° C. To the cooled reaction solution, 8.74 parts by mass of Karenz MOI (manufactured by Showa Denko K. K.), 0.125 part by mass of dibutyltin dilaurate, 0.125 part by mass of p-methoxyphenol and 10 parts by mass of PGMEA were added and stirred for 3 hours, thereby obtaining a 49.5% by mass solution of the macromonomer MM-1. The thus-obtained macromonomer MM-1 was confirmed by GPC (gel permeation chromatography) under the condition of addition of N-methylpyrrolidone and 0.01 mol/L lithium bromide/polystyrene standard. As a result, the macromonomer MM-1 was found to have a mass average molecular weight (Mw) of 4,040, a number average molecular weight (Mn) of 1,930 and a molecular weight distribution (Mw/Mn) of 2.09.

Synthesis Example 3

Synthesis of Macromonomer MM-2

First, 80.0 parts by mass of PGMEA was put in a reactor equipped with a cooling tube, an addition funnel, a nitrogen inlet, a mechanical stirrer and a digital thermometer and heated to 90° C. with stirring under a nitrogen flow. A mixed solution of 100.0 parts by mass of methyl methacrylate, 4.0 parts by mass of mercaptoethanol, 30 parts by mass of PGMEA and 1.0 part by mass of AIBN was added thereto in a dropwise manner for 1.5 hours, and the mixture was reacted for 3 hours. Next, the nitrogen flow was stopped and the reaction solution was cooled to 80° C. To the cooled reaction solution, 8.74 parts by mass of Karenz MOI, 0.125 part by mass of dibutyltin dilaurate, 0.125 part by mass of p-methoxyphenol, and 10 parts by mass of PGMEA were added and stirred for 3 hours, thereby obtaining a 49.8% by mass solution of the macromonomer MM-2. The thus-obtained macromonomer MM-2 was confirmed by GPC (gel permeation chromatography) under the condition of addition of N-methylpyrrolidone and 0.01 mol/L lithium bromide/polystyrene standard. As a result, the macromonomer MM-2 was found to have a mass average molecular weight (Mw) of 4,130, a number average molecular weight (Mn) of 1,940 and a molecular weight distribution (Mw/Mn) of 2.13.

Synthesis Example 4

Synthesis of Graft Copolymer GP-1

First, 80.0 parts by mass of PGMEA was put in a reactor equipped with a cooling tube, an addition funnel, a nitrogen inlet, a mechanical stirrer and a digital thermometer and heated to 85° C. with stirring under a nitrogen flow. A mixed solution of 67.33 parts by mass of the macromonomer MM-1 solution of Synthesis Example 2 (active solid content 33.33 parts by mass), 16.67 parts by mass of 2-(dimethylamino)ethyl methacrylate (DMA), 1.24 parts by mass of n-dodecyl mercaptan, 20.0 parts by mass of PGMEA and 0.5 part by mass of AIBN was added thereto in a dropwise manner for 1.5 hours. The mixture was heated and stirred for 3 hours. Then, a mixed solution of 0.10 part by mass of AIBN and 10.0 parts by mass of PGMEA was added thereto in a dropwise manner for 10 minutes, and the mixture was further heated at the same temperature for one hour, thereby obtaining a 26.0% by mass solution of the graft copolymer GP-1. As a result of GPC measurement, the thus-obtained graft copolymer GP-1 was found to have a mass average molecular weight (Mw) of 11,510, a number average molecular weight (Mn) of 4,730 and a molecular weight distribution (Mw/Mn) of 2.43.

Synthesis Example 5

Synthesis of Graft Copolymer GP-2

First, 80.0 parts by mass of PGMEA was put in a reactor equipped with a cooling tube, an addition funnel, a nitrogen inlet, a mechanical stirrer and a digital thermometer and heated to 85° C. with stirring under a nitrogen flow. A mixed solution of 66.93 parts by mass of the macromonomer MM-2 solution of Synthesis Example 3 (active solid content 33.33 parts by mass), 16.67 parts by mass of DMA, 1.24 parts by mass of n-dodecyl mercaptan, 20.0 parts by mass of PGMEA and 0.5 part by mass of AIBN was added thereto in a dropwise manner for 1.5 hours. The mixture was heated and stirred for 3 hours. Then, a mixed solution of 0.10 part by mass of AIBN and 10.0 parts by mass of PGMEA was added thereto in a dropwise manner for 10 minutes, and the mixture was further heated at the same temperature for one hour, thereby obtaining a 26.2% by mass solution of the graft copolymer GP-2. As a result of GPC measurement, the thus-obtained graft copolymer GP-2 was found to have a mass average molecular weight (Mw) of 11,230, a number average molecular weight (Mn) of 4,350 and a molecular weight distribution (Mw/Mn) of 2.58.

Synthesis Example 6

Synthesis of Graft Copolymer GP-3

First, 80.0 parts by mass of PGMEA was put in a reactor equipped with a cooling tube, an addition funnel, a nitrogen inlet, a mechanical stirrer and a digital thermometer and heated to 85° C. with stirring under a nitrogen flow. A mixed solution of 50.50 parts by mass of the macromonomer MM-1 solution of Synthesis Example 2 (active solid content 25.00 parts by mass), 11.9 parts by mass of PLACCEL FA-10L (manufactured by DAICEL Chemical Industries, Ltd., 10 mol caprolactone-added hydroxyethyl acrylate, 70% solution, active solid content 8.33 parts by mass), 16.67 parts by mass of DMA, 1.24 parts by mass of n-dodecyl mercaptan, 30.0 parts by mass of PGMEA and 0.5 part by mass of AIBN was added thereto in a dropwise manner for 1.5 hours. The mixture was heated and stirred for 3 hours. Then, a mixed solution of 0.10 part by mass of AIBN and 10.0 parts by mass of PGMEA was added thereto in a dropwise manner for 10 minutes, and the mixture was further heated at the same temperature for one hour, thereby obtaining a 25.8% by mass solution of the graft copolymer GP-3. As a result of GPC measurement, the thus-obtained graft copolymer GP-3 was found to have a mass average molecular weight (Mw) of 12,700, a number average molecular weight (Mn) of 4,880 and a molecular weight distribution (Mw/Mn) of 2.60.

Synthesis Example 7

Synthesis of Organic Phosphonate Ester Compound 1

First, 142.61 parts by mass of diethylene glycol ethyl methyl ether (EMDG), 50.00 parts by mass of phenylphosphonic acid (product name: PPA, manufactured by: Nissan Chemical Industries, Ltd.) and 0.10 part by mass of p-methoxyphenol were put in a reactor equipped with a cooling tube, an addition funnel, a nitrogen inlet, a mechanical stirrer and a digital thermometer and heated to 120° C. with stirring under a nitrogen flow. Then, 44.96 parts by mass of glycidyl methacrylate (GMA) was added thereto in a dropwise manner for 30 minutes. The mixture was heated and stirred for 2 hours, thereby obtaining a 40.0% by mass solution of the organic phosphonate ester compound (PPA-GMA) containing an organic phosphonic acid monoester compound in which one of two acidic groups of the PPA were esterified with the epoxy groups of the GMA. The progress of the esterification reaction was confirmed by acid value measurement. The compositional ratio of the resulting product was confirmed by $^{31}$P-NMR measurement. The organic phosphonate ester compound 1 was found to have an acid value of 190 mgKOH/g and such a compositional ratio that the organic phosphoate monoester compound is 55%; the organic phosphoate diester compound is 23%; and PPA is 22%.

Production Example 1

Preparation of Dispersant Solution A

In a 100 mL recovery flask, 35.49 parts by mass of the graft copolymer GP-1 solution obtained in Synthesis Example 4 (active solid content 9.23 parts by mass) was dissolved in 13.74 parts by mass of PGMEA. In addition, 0.77 part by mass of phenylphosphonic acid (product name: PPA, manufactured by: Nissan Chemical Industries, Ltd.) (0.25 molar equivalent with respect to the tertiary amino groups of the graft copolymer) was added thereto. The mixture was stirred at 40° C. for 30 minutes, thereby preparing the dispersant solution A (solid content 20% by mass). At this time, a salt was formed by acid-base reaction of the amino group of the graft copolymer with the phenylphosphonic acid.

Production Example 2

Preparation of Dispersant Solution B

The dispersant solution B was prepared in the same manner as Production Example 1, except that the amount of the PGMEA was changed to 13.90 parts by mass; the amount of the graft copolymer GP-1 solution of Synthesis Example 4 was changed to 35.27 parts by mass (active solid content 9.17 parts by mass); and 0.83 part by mass of phenylphosphinic acid (0.3 molar equivalent with respect to the amino groups of the graft copolymer) was used in place of the phenylphosphonic acid. At this time, a salt was formed by acid-base reaction of the amino group of the graft copolymer with the phenylphosphinic acid.

Production Example 3

Preparation of Dispersant Solution C

The dispersant solution C was prepared in the same manner as Production Example 1, except that the amount of the PGMEA was changed to 14.14 parts by mass; the amount of the graft copolymer GP-1 solution of Synthesis Example 4 was changed to 34.95 parts by mass (active solid content 9.09 parts by mass); and 0.91 part by mass of benzenesulfonic acid (0.3 molar equivalent with respect to the amino groups of the graft copolymer) was used in place of the phenylphosphonic acid. At this time, a salt was formed by acid-base reaction of the amino group of the graft copolymer with the benzenesulfonic acid.

Production Example 4

Preparation of Dispersant Solution D

The dispersant solution D was prepared in the same manner as Production Example 1, except that the amount of the PGMEA was changed to 12.73 parts by mass; the amount of the graft copolymer GP-1 solution of Synthesis Example 4 was changed to 36.86 parts by mass (active solid content 9.58 parts by mass); and 0.42 part by mass of phosphonic acid (0.25 molar equivalent with respect to the amino groups of the graft copolymer) was used in place of the phenylphosphonic acid. At this time, a salt was formed by acid-base reaction of the amino group of the graft copolymer with the phosphonic acid.

Production Example 5

Preparation of Dispersant Solution E

The dispersant solution E was prepared in the same manner as Production Example 1, except that the amount of the PGMEA was changed to 12.29 parts by mass; the amount of the graft copolymer GP-1 solution of Synthesis Example 4 was changed to 36.91 parts by mass (active solid content 9.60 parts by mass); and 0.80 part by mass of a 50% by mass aqueous solution of phosphinic acid (active solid content 0.40 part by mass, 0.3 molar equivalent with respect to the amino groups of the graft copolymer) was used in place of the phenylphosphonic acid. At this time, a salt was formed by acid-base reaction of the amino group of the graft copolymer with the phosphinic acid.

Production Example 6

Preparation of Dispersant Solution F

The dispersant solution F was prepared in the same manner as Production Example 1, except that the amount of the PGMEA was changed to 13.70 parts by mass; the amount of the graft copolymer GP-1 solution of Synthesis Example 4 was changed to 32.30 parts by mass (active solid content 8.40 parts by mass); and 4.00 parts by mass of the organic phosphonate ester compound 1 (PPA-GMA) obtained in Synthesis Example 7 (active solid content 1.60 parts by mass, 0.3 molar equivalent with respect to the amino groups of the graft copolymer) was used in place of the phenylphosphonic acid. At this time, a salt was formed by acid-base reaction of the amino group of the graft copolymer with the organic phosphonate ester compound 1.

Production Example 7

Preparation of Dispersant Solution G

The dispersant solution G was prepared in the same manner as Production Example 2, except that the amount of the PGMEA was changed to 14.17 parts by mass, and 35.00 parts by mass of the graft copolymer GP-2 solution of Synthesis Example 5 (active solid content 9.17 parts by mass) was used in place of the graft copolymer GP-1 solution of Synthesis Example 4. At this time a salt was formed by acid-base reaction of the amino group of the graft copolymer with the phenylphosphinic acid.

Production Example 8

Preparation of Dispersant Solution H

The dispersant solution H was prepared in the same manner as Production Example 2, except that the amount of the PGMEA was changed to 13.62 parts by mass, and 35.55 parts by mass of the graft copolymer GP-3 solution of Synthesis Example 6 (active solid content 9.17 parts by mass) was used in place of the graft copolymer GP-1 solution of Synthesis Example 4. At this time, a salt was formed by acid-base reaction of the amino group of the graft copolymer with the phenylphosphinic acid.

Production Example 9

Preparation of Dispersant Solution I

In a 100 mL recovery flask, 35.60 parts by mass of the graft copolymer GP-1 solution of Synthesis Example 4 (active solid content 9.25 parts by mass) was dissolved in 13.66 parts by mass of PGMEA. In addition, 0.75 part by mass of benzyl chloride (0.3 molar equivalent with respect to the tertiary amino groups of the graft copolymer) was added thereto. The mixture was stirred at 120° C. for 2 hours, thereby preparing the dispersant solution I (solid content 20% by mass). At this time, a salt was formed by quaternization reaction of the amino group of the graft copolymer with the benzyl chloride.

Production Example 10

Preparation of Dispersant Solution J

The dispersant solution J was prepared in the same manner as Production Example 9, except that the amount of the PGMEA was changed to 12.86 parts by mass; the amount of the graft copolymer GP-1 solution of Synthesis Example 4 was changed to 36.68 parts by mass (active solid content 9.54 parts by mass); and 0.46 part by mass of allyl chloride (0.3 molar equivalent with respect to the amino groups of graft copolymer) was used in place of the benzyl chloride. At this time, a salt was formed by quaternization reaction of the amino group of the graft copolymer with the allyl chloride.

Production Example 11

Preparation of Dispersant Solution K

The dispersant solution K was prepared in the same manner as Production Example 1, except that the amount of the PGMEA was changed to 13.57 parts by mass; the amount of the graft copolymer GP-1 solution of Synthesis Example 4 was changed to 35.71 parts by mass (active solid content 9.29 parts by mass); and 0.71 part by mass of allyl bromide (0.3 molar equivalent with respect to the amino groups of the graft copolymer) was used in place of the phenylphosphonic acid. At this time, a salt was formed by quaternization reaction of the amino group of the graft copolymer with the allyl bromide.

Example 1

Preparation of Metal Particle Dispersion A

First, 40.0 parts by mass of the copper particles obtained in Synthesis Example 1, 15.0 parts by mass of the dispersant solution A obtained in Production Example 1 (active solid content 3.0 parts by mass) and 45.0 parts by mass of PGMEA were mixed. Using a paint shaker (manufactured by Asada Iron Works Co., Ltd.), the mixture was subjected to pre-dispersion for 1 hour with 2 mm zirconia beads. Then, the mixture was subjected to main dispersion for 4 hours with 0.1 mm zirconia beads, thereby obtaining the metal particle dispersion A of Example 1.

Examples 2 to 11

Preparation of Metal Particle Dispersions B to K

The metal particle dispersions B to K of Examples 2 to 11 were obtained in the same manner as Example 1, except that the dispersant solutions B to K obtained in Production Examples 2 to 11 were used respectively, in place of the dispersant solution A.

Comparative Example 1

Preparation of Metal Particle Dispersion X1

The metal particle dispersion X1 of Comparative Example 1 was obtained in the same manner as Example 1, except that 11.54 parts by mass of the graft copolymer GP-1 solution of Synthesis Example 4 (active solid content 3.0 parts by mass), in which no salt was formed, was used in place of the dispersant solution A, and the amount of the PGMEA was changed to 48.46 parts by mass.

Comparative Example 2

Preparation of Metal Particle Dispersion X2

The metal particle dispersion X2 of Comparative Example 2 was obtained in the same manner as Example 1, except that 3.0 parts by mass of SOLSPERSE 71000 (manufactured by The Lubrizol Corporation) was used in place of the dispersant solution A, and the amount of the PGMEA was changed to 57.0 parts by mass.

Comparative Example 3

Preparation of Metal Particle Dispersion X3

The metal particle dispersion X3 of Comparative Example 3 was obtained in the same manner as Example 1, except that 3.0 parts by mass of BYK-111 (manufactured by BYK Japan KK) was used in place of the dispersant solution A, and the amount of the PGMEA was changed to 57.0 parts by mass.

Comparative Example 4

Preparation of Metal Particle Dispersion X4

The metal particle dispersion X4 of Comparative Example 4 was obtained in the same manner as Example 1, except that 10.0 parts by mass of BYK-161 (manufactured by BYK Japan KK) (active solid content 3.0 parts by mass) was used in place of the dispersant solution A, and the amount of the PGMEA was changed to 50.0 parts by mass.

Comparative Example 5

Preparation of metal particle dispersion X5

The metal particle dispersion X5 of Comparative Example 5 was obtained in the same manner as Example 1, except that 3.0 parts by mass of AJISPER PB821 (manufactured by Ajinomoto Fine-Techno. Co., Inc.) was used in place of the dispersant solution A, and the amount of the PGMEA was changed to 57.0 parts by mass.

(Evaluation)

<Evaluation of Dispersibility>

For the evaluation of the dispersibility of the metal particles, the average particle diameter of the metal particles contained in each of the metal particle dispersions obtained in Examples and Comparative Examples and the shear viscosity of each of the metal particle dispersions obtained in Examples and Comparative Examples, were measured. For the measurement of the average particle diameter, "Nanotrac Particle Size Distribution Analyzer UPA-EX150" manufactured by Nikkiso Co., Ltd. was used. For the measurement of the viscosity, "Rheometer MCR301" manufactured by Anton Paar was used, and the shear viscosity at a shear rate of 60 rpm was measured. The results are shown in Table 1.

<Evaluation of Precipitates>

Each of the metal particle dispersions obtained in Examples and Comparative Examples was left to stand for one week in a refrigerator. Then, each metal particle dispersion was visually observed to check the presence of precipitates. The results are shown in Table 1.

The metal particle dispersion can be said to have excellent dispersion stability when no precipitates are found.

<Evaluation of Sintering>

(1) Production of Electroconductive Substrate

Each of the metal particle dispersions obtained in Examples and Comparative Examples was applied onto a glass base material (product name: OA-10G, manufactured by: Nippon Electric Glass Co., Ltd., thickness 0.7 mm with a wire bar and dried at 80° C. for 15 minutes, thereby obtaining a coating film having a thickness of 2 μm. The coating film was baked at 300° C. for 30 minutes under a mixed gas atmosphere of 3% by volume of hydrogen and 97% by volume of nitrogen, thereby obtaining an electroconductive substrate.

(2) Measurement of Sheet Surface Resistance

Using a surface resistance meter ("Loresta GP" manufactured by Dia Instruments, Co., Ltd., PSP type probe), the sintered film of each of the substrates of Examples 1 to 11 and Comparative Examples 1 to 5 obtained under the above (1), was brought into contact with the four-point probe to measure the sheet surface resistance by the four-probe method. The results are shown in Table 1.

When the sheet surface resistance is low, the electroconductive substrate can be said to have excellent low-temperature sintering properties and less organic components remaining therein. The upper measurement limit of the sheet surface resistance by this measurement method was $10^8 \Omega/\square$.

TABLE 1

| | Pigment dispersant | | Evaluation of dispersibility | | | Sheet surface resistance |
|---|---|---|---|---|---|---|
| | | | Particle diameter | Viscosity | | |
| | Polymer | Salt-forming agent | (nm) | (mPa · s) | Precipitates | (Ω/□) |
| Example 1 | GP-1 | Phenylphosphonic acid | 55 | 2.9 | Not found | 0.55 |
| Example 2 | GP-1 | Phenylphosphinic acid | 62 | 2.7 | Not found | 0.39 |
| Example 3 | GP-1 | Benzenesulfonic acid | 54 | 2.5 | Not found | 0.95 |

TABLE 1-continued

| | Pigment dispersant | | Evaluation of dispersibility | | | |
|---|---|---|---|---|---|---|
| | Polymer | Salt-forming agent | Particle diameter (nm) | Viscosity (mPa·s) | Precipitates | Sheet surface resistance (Ω/□) |
| Example 4 | GP-1 | Phosphonic acid | 52 | 2.5 | Not found | 0.59 |
| Example 5 | GP-1 | Phosphinic acid | 63 | 2.4 | Not found | 0.62 |
| Example 6 | GP-1 | Organic phosphonate ester compound 1 | 65 | 2.5 | Not found | 0.77 |
| Example 7 | GP-2 | Phenylphosphinic acid | 60 | 2.8 | Not found | 0.42 |
| Example 8 | GP-3 | Phenylphosphinic acid | 65 | 2.9 | Not found | 0.58 |
| Example 9 | GP-1 | Benzyl chloride | 75 | 2.6 | Not found | 0.88 |
| Example 10 | GP-1 | Allyl chloride | 47 | 2.5 | Not found | 0.55 |
| Example 11 | GP-1 | Allyl bromide | 47 | 2.5 | Not found | 0.42 |
| Comparative Example 1 | GP-1 | — | 68 | 4.0 | Found | 0.35 |
| Comparative Example 2 | SOLSPERSE 71000 | | 71 | 6.3 | Found | Overload |
| Comparative Example 3 | BYK-111 | | 56 | 1.7 | Found | Overload |
| Comparative Example 4 | BYK-161 | | 117 | 5.0 | Found | Overload |
| Comparative Example 5 | AJISPER PB821 | | 58 | 4.0 | Found | Overload |

From the results shown in Table 1, it is clear that the metal particle dispersions of Examples 1 to 11 each comprising, as the dispersant, the graft copolymer having the constitutional unit represented by the general formula (I) and the constitutional unit represented by the general formula (II), in which at least part of nitrogen sites of the constitutional units represented by the general formula (I) each form a salt with at least one selected from the group consisting of a halogenated hydrocarbon, a specific phosphorus compound and a specific sulfonic acid compound, have excellent dispersibility and dispersion stability, produce no precipitates, and are suitable for low-temperature sintering. The metal particle dispersion of Comparative Example 1, the dispersion comprising the dispersant which has the constitutional unit represented by the general formula (I) and the constitutional unit represented by the general formula (II) and in which no salt is formed, produced precipitates and has poor dispersion stability. The metal particle dispersions of Comparative Examples 2 to 5, the dispersions comprising the commercially-available dispersants, produced precipitates and have poor dispersion stability. It is also clear that Comparative Examples 2 to 5 have high sheet surface resistances and poor low-temperature sintering properties.

Synthesis Example 8

Production of Silver Particles

A solution obtained by mixing 5 g of poly(2-dimethyl-aminoethyl methacrylate) (mass average molecular weight 2,000) with 50 mL of pure water was added to a mixed solution of 50 g of silver nitrate and 200 mL of pure water and reacted with the silver nitrate for one hour, thereby producing silver particles. Then, the silver particles were washed by filtration and dried, thereby obtaining silver particles of Synthesis Example 8. The silver particles were observed with a scanning transmission electron microscope (STEM) and found to have an average primary particle diameter of 40 nm.

Example 12

Preparation of Metal Particle Dispersion L

First, 10.0 parts by mass of the silver particles obtained in Synthesis Example 8, 30.0 parts by mass (active solid content 6.0 parts by mass) of the dispersant solution B obtained in Production Example 2, and 60.0 parts by mass of PGMEA were mixed. Using a paint shaker, the mixture was subjected to pre-dispersion for 1 hour with 2 mm zirconia beads. Then, the mixture was subjected to main dispersion for 8 hours with 0.1 mm zirconia beads, thereby obtaining the metal particle dispersion L of Example 12.

Example 13

Preparation of Metal Particle Dispersion M

The metal particle dispersion M of Example 13 was obtained in the same manner as Example 12, except that molybdenum particles (manufactured by Sigma-Aldrich, 100 nm or less) were used in place of the silver particles, and the main dispersion time was changed to 6 hours.

Example 14

Preparation of Metal Particle Dispersion N

The metal particle dispersion N of Example 14 was obtained in the same manner as Example 12, except that alumina particles (manufactured by Sigma-Aldrich, 100 nm or less) were used in place of the silver particles, and the main dispersion time was changed to 2 hours.

Example 15

Preparation of Metal Particle Dispersion O

First, 10.0 parts by mass of ATO particles (tin-doped antimony oxide particles, "T-1-20L" manufactured by Mitsubishi Materials Corporation, average particle diameter 20 nm), 15.0 parts by mass of the dispersant solution B obtained in Production Example 2 (active solid content 3.0 parts by mass), 75.0 parts by mass of PGMEA were mixed. Using a paint shaker, the mixture was subjected to pre-dispersion for 1 hour with 2 mm zirconia beads. Then, the mixture was subjected to main dispersion for 24 hours with 0.1 mm zirconia beads, thereby obtaining the metal particle dispersion O of Example 15.

Example 16

Preparation of Metal Particle Dispersion P

The metal particle dispersion P of Example 16 was obtained in the same manner as Example 15, except that the dispersant solution K of Production Example 11 was used in place of the dispersant solution B.

Example 17

Preparation of Metal Particle Dispersion Q

The metal particle dispersion Q of Example 17 was obtained in the same manner as, Example 15, except that ITO particles (tin-doped indium oxide particles, "Nano Tek ITO-R" manufactured by C. I. Kasei Company, Limited, average particle diameter 30 nm) were used in place of the ATO particles, and the main dispersion time was changed to 12 hours.
(Evaluation)
<Evaluation of Dispersibility>
For the evaluation of the dispersibility of the metal particles, the average particle diameter of the metal particles contained in each of the metal particle dispersions obtained in Examples 12 to 17, and the shear viscosity of each of the metal particle dispersions obtained in Examples 12 to 17 were measured. For the measurement of the average particle diameter, "Nanotrac Particle Size Distribution Analyzer UPA-EX150" manufactured by Nikkiso Co., Ltd. was used. For the measurement of the viscosity, "Rheometer MCR301" manufactured by Anton Paar was used, and the shear viscosity at a shear rate of 60 rpm was measured. The results are shown in Table 2.
<Evaluation of Precipitates>
Each of the metal particle dispersions obtained in Examples 12 to 17 was left to stand for one week in a refrigerator. Then, each metal particle dispersion was visually observed to check the presence of precipitates. The results are shown in Table 2.

The metal particle dispersion can be said to have excellent dispersion stability when no precipitates are found.

copolymer having the constitutional unit represented by the general formula (I) and the constitutional unit represented by the general formula (II), in which at least part of nitrogen sites of the constitutional units represented by the general formula (I) each form a salt with at least one selected from the group consisting of a halogenated hydrocarbon, a specific phosphorus compound and a specific sulfonic acid compound, have excellent dispersibility and dispersion stability and produce no precipitates, even though the metal particles used are those other than copper particles.

Example 18

Production of Heat Ray-Absorbing Films

First, 4.81 parts by mass of the metal particle dispersion Q of Example 17, 1.78 parts by mass of pentaerythritol triacrylate and 0.10 part by mass of Irgacure 814 (manufactured by BASF) were mixed to prepare an ink. The ink was applied on a PET film to a thickness of 10 μm, dried in an oven at 70° C. for 3 minutes, and then irradiated with ultraviolet rays at 300 mJ/cm$^2$ by a UV exposure device under a nitrogen atmosphere, thereby producing a cured coating film.
(Evaluation)
<Measurement of Transmittance>
Using a spectrophotometer(UV3100 manufactured by Shimadzu Corporation), the cured coating film of Example 18 was measured for the transmittance in a wavelength range of 300 to 3,000 nm. The results of measuring the infrared transmittance (transmittance at 1,200 nm) and the visible light transmittance (transmittance at 650 nm) are shown in Table 3.

TABLE 3

| | Transmittance (%) | |
|---|---|---|
| | Visible light (650 nm) | Infrared light (1,200 nm) |
| Example 18 | 85.4 | 39.8 |

Synthesis Example 9

Synthesis of Macromonomer MM-3

First, 80.0 parts by mass of PGMEA was put in a reactor equipped with a cooling tube, an addition funnel, a nitrogen inlet, a mechanical stirrer and a digital thermometer and heated to 90° C. with stirring under a nitrogen flow. A mixed solution of 100.0 parts by mass of isobutyl methacrylate, 4.0

TABLE 2

| | | Dispersant | | Evaluation of dispersibility | | |
|---|---|---|---|---|---|---|
| | Metal particles | Polymer | Modifier | Particle diameter (nm) | Viscosity (mP · s) | Precipitates |
| Example 12 | Silver | GP-1 | Phenylphosphinic acid | 82 | 2.0 | Not found |
| Example 13 | Molybdenum | GP-1 | Phenylphosphinic acid | 72 | 1.8 | Not found |
| Example 14 | Alumina | GP-1 | Phenylphosphinic acid | 102 | 2.7 | Not found |
| Example 15 | ATO | GP-1 | Phenylphosphinic acid | 28 | 2.4 | Not found |
| Example 16 | ATO | GP-1 | Allyl bromide | 32 | 2.5 | Not found |
| Example 17 | ITO | GP-1 | Phenylphosphinic acid | 55 | 2.1 | Not found |

As shown by the results of Table 2, the metal particle dispersions each comprising, as the dispersant, the graft parts by mass of mercaptoethanol, 30.0 parts by mass of PGMEA and 1.0 part by mass of AIBN was added thereto in a dropwise manner for 1.5 hours, and the mixture was reacted for 3 hours. Next, the nitrogen flow was stopped and the reaction solution was cooled to 80° C. To the cooled reaction solution, 8.74 parts by mass of Karenz MOI, 0.125 part by mass of dibutyltin dilaurate, 0.125 part by mass of p-methoxyphenol and 10.0 parts by mass of PGMEA were added and stirred for 3 hours, thereby obtaining a 50.0% by mass solution of the macromonomer MM-3. The thus-obtained macromonomer MM-3 was confirmed by GPC (gel permeation chromatography) under the condition of addition of N-methylpyrrolidone and 0.01 mol/L lithium bromide/polystyrene standard. As a result, the macromonomer MM-3 was found to have a mass average molecular weight (Mw) of 3,720, a number average molecular weight (Mn) of 1,737 and a molecular weight distribution (Mw/Mn) of 2.14.

Synthesis Example 10

Synthesis of Graft Copolymer GP-4

First, 80.0 parts by mass of PGMEA was put in a reactor equipped with a cooling tube, an addition funnel, a nitrogen inlet, a mechanical stirrer and a digital thermometer and heated to 85° C. with stirring under a nitrogen flow. A mixed solution of 66.66 parts by mass of the macromonomer MM-3 solution of Synthesis Example 9 (active solid content 33.33 parts by mass), 16.67 parts by mass of 2-(dimethyl-amino)ethyl methacrylate (DMA), 1.24 parts by mass of n-dodecyl mercaptan, 25.0 parts by mass of PGMEA and 0.5 part by mass of AIBN was added thereto in a dropwise manner for 1.5 hours. The mixture was heated and stirred for 3 hours. Then, a mixed solution of 0.10 part by mass of AIBN and 10.0 parts by mass of PGMEA was added thereto in a dropwise manner for 10 minutes, and the mixture was further heated at the same temperature for 1 hour, thereby obtaining a 25.2% by mass solution of the graft copolymer GP-4. As a result of GPC measurement, the thus-obtained graft copolymer GP-4 was found to have a mass average molecular weight (Mw) of 13,063, a number average molecular weight (Mn) of 5,259 and a molecular weight distribution (Mw/Mn) of 2.42.

Synthesis Example 11

Synthesis of Graft Copolymer GP-5

First, 80.0 parts by mass of PGMEA was put in a reactor equipped with a cooling tube, an addition funnel, a nitrogen inlet, a mechanical stirrer and a digital thermometer and heated to 85° C. with stirring under a nitrogen flow. A mixed solution of 90.0 parts by mass of the macromonomer MM-3 solution of Synthesis Example 9 (active solid content 45.0 parts by mass), 5.0 parts by mass of DMA, 1.24 parts by mass of n-dodecyl mercaptan, 10.0 parts by mass of PGMEA and 0.5 part by mass of AIBN was added thereto in a dropwise manner for 1.5 hours. The mixture was heated and stirred for 3 hours. Then, a mixed solution of 0.10 part by mass of AIBN and 10.0 parts by mass of PGMEA was added thereto in a dropwise manner for 10 minutes, and the mixture was further heated at the same temperature for one hour, thereby obtaining a 27.0% by mass solution of the graft copolymer GP-5. As a result of GPC measurement, the thus-obtained graft copolymer GP-5 was found to have a mass average molecular weight (Mw) of 12,761, a number average molecular weight (Mn) of 5,482 and a molecular weight distribution (Mw/Mn) of 2.33.

Production Example 12

Preparation of dispersant solution L

In a 100 mL recovery flask, 33.16 parts by mass of the graft copolymer GP-4 solution of Synthesis Example 10 (active solid content 8.36 parts by mass) was dissolved in 11.19 parts by mass of PGMEA. In addition, 0.64 part by mass of allyl bromide (0.3 molar equivalent with respect to the tertiary amino groups of the graft copolymer) was added thereto. The mixture was stirred at 40° C. for 30 minutes, thereby preparing the dispersant solution L (solid content 20% by mass). At this time, a salt was formed by quaternization reaction of the amino group of the graft copolymer GP-4 with the allyl bromide.

Production Example 13

Preparation of Dispersant Solution M

The dispersant solution M (solid content 20% by mass) was prepared in the same manner as Production Example 12, except that the amount of the PGMEA was changed to 13.41 parts by mass; 30.95 parts by mass of the graft copolymer GP-5 solution of Synthesis Example 11 (active solid content 8.36 parts by mass) was used; and the amount of the allyl bromide was changed to 0.64 part by mass (1.0 molar equivalent with respect to the amino groups of the graft copolymer). At this time, a salt was formed by quaternization reaction of the amino group of the graft copolymer GP-5 with the allyl bromide.

Synthesis Example 12

Production of CuInGaS Particles

First, 50 ml of oleylamine was added to 5.11 g of bis(2,4-pentanedionato)copper(III), 6.47 g of tris(2,4-pentanedionato)indium(III) and 3.04 g of tris(2,4-pentanedionato)gallium(III) and heated to 150° C. for 10 minutes with stirring under a nitrogen flow. The mixture was heated to 285° C., injected with 2.45 g of sulfur dissolved in 60 ml of oleylamine, reacted for 30 minutes, cooled to room temperature and then mixed with isopropyl alcohol (IPA), thereby precipitating the resulting product. The resulting product was separated by centrifugal separation and dried, thereby obtaining CuInGaS particles.

Example 19

Preparation of Metal Particle Dispersion R

The CuInGaS particles obtained in Synthesis Example 12, 15.0 parts by mass of the dispersant solution L obtained in Production Example 12 (active solid content 3.0 parts by mass) and 75.0 parts by mass of methyl isobutyl ketone (MIBK) were mixed. Using a paint shaker (manufactured by Asada Iron Works Co., Ltd.), the mixture was subjected to pre-dispersion for 1 hour with 2 mm zirconia beads. Then, the mixture was subjected to main dispersion for 1 hour with 0.1 mm zirconia beads, thereby obtaining the metal particle dispersion R of Example 19.

Example 20

Preparation of Metal Particle Dispersion S

The metal particle dispersion S of Example 20 was obtained in the same manner as Example 19, except that the dispersant solution M obtained in Production Example 13 was used in place of the dispersant solution L.

Example 21

Preparation of Metal Particle Dispersion T

First, 4.3 parts by mass of copper sulfide (manufactured by Alfa Aesar), 4.4 parts by mass of indium sulfide (manufactured by Alfa Aesar), 1.3 parts by mass of gallium sulfide (manufactured by Aldrich), 15.0 parts by mass of the dispersant solution L obtained in Production Example 12 (active solid content 3.0 parts by mass) and 75.0 parts by mass of MIBK were mixed. Using a paint shaker, the mixture was subjected to pre-dispersion for 1 hour with 2 mm zirconia beads. Then, the mixture was subjected to main dispersion for 3 hours with 0.1 mm zirconia beads, thereby obtaining the metal particle dispersion T of Example 21.

Comparative Example 6

Preparation of Metal Particle Dispersion U

The metal particle dispersion U of Comparative Example 6 was obtained in the same manner as Example 19, except that 3.0 parts by mass of oleylamine and 97.0 parts by mass of MIBK were used in place of the dispersant solution L.

Comparative Example 7

Preparation of Metal Particle Dispersion V

The metal particle dispersion V was obtained in the same manner as Example 19, except that 3.0 parts by mass of PB822 (manufactured by Ajinomoto Fine-Techno. Co., Inc.) and 97.0 parts by mass of MIBK were used in place of the dispersant solution L.

Comparative Example 8

Preparation of Metal Particle Dispersion W

The metal particle dispersion W of Comparative Example 8 was obtained in the same manner as Example 19, except that 3.0 parts by mass of BYK-180 (manufactured by BYK Japan KK) and 97.0 parts by mass of MIBK were used in place of the dispersant solution L.

(Evaluation)
<Evaluation of Dispersion Stability>

For the evaluation of the dispersion stability of the metal particles, each of the metal particle dispersions obtained in Examples 19 to 21 and Comparative Examples 6 to 8 was left to stand at room temperature, and the number of days required by the metal particles to begin to precipitate was measured.

The results are shown in Table 4.
<Evaluation of Remaining Carbon Amount>
(1) Production of CuInGaS Thin Film Each of the metal particle dispersions obtained in Examples 19 to 21 and Comparative Examples 6 to 8 was applied onto a glass base material (product name: OA-10G; manufactured by: Nippon Electric Glass Co., Ltd.; thickness 0.7 mm) with a spin coater and dried at 80° C. for 1 minutes, thereby obtaining a coating film having a thickness of 500 nm. The coating film was baked at 350° C. for 5 minutes in air, thereby obtaining a CuInGaS thin film.

(2) Measurement of Remaining Carbon Amount (C/Cu)

Using an SEM-EDX system (energy dispersive X-ray analyzer "Quanta x70" manufactured by Hitachi High-Technologies Corporation), each of the thin films of Examples 19 to 21 and Comparative Examples 6 to 8 obtained under the above (1) was measured for the concentration of Cu atoms and that of C atoms. The remaining carbon amount was calculated by the following formula: the concentration of C atoms/the concentration of Cu atoms. The results are shown in Table 4.

It can be said that the smaller the remaining carbon amount, the less the organic components remaining in the film.

TABLE 4

| | | Evaluation | | | |
|---|---|---|---|---|---|
| | Metal particles | Dispersant | | Dispersion stability | Remaining carbon amount in CIGS thin film |
| | | Polymer | Modifier | | |
| Example 19 | CuInGaS | GP-4 | Allyl bromide | 2 Months or more | 0.66 |
| Example 20 | CuInGaS | GP-5 | Allyl bromide | 2 Months or more | 0.69 |
| Example 21 | CuS, InS, GaS | GP-4 | Allyl bromide | 2 Months or more | 0.78 |
| Comparative Example 6 | CuInGaS | Oleylamine | | 3 Days | 2.13 |
| Comparative Example 7 | CuInGaS | AJISPER PB822 | | Gelled in one month | 1.56 |
| Comparative Example 8 | CuInGaS | BYK-180 | | Not dispersed | Film was not formed and unmeasurable |

REFERENCE SIGNS LIST

1. Base material
2. Metal film
3. Thin film
4. Metal particle
5. Coating film
10. Metal-containing layer
100. Substrate

The invention claimed is:

1. A metal particle dispersion comprising metal particles, a dispersant and a solvent,
    wherein the metal particles contain one or more selected from the group consisting of gold, silver, copper, nickel, platinum, palladium, molybdenum, aluminum, antimony, tin, chromium, lanthanum, indium, gallium, zinc and germanium, and
    wherein the dispersant is a graft copolymer having at least one constitutional unit represented by the following general formula (I) and at least one constitutional unit represented by the following general formula (II), and in which at least part of nitrogen sites of the constitutional units represented by the general formula (I) each form a salt with at least one selected from the group consisting of a halogenated allyl and an acidic phosphorus compound represented by the following general formula (V):

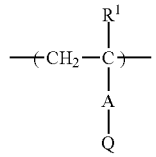
(I)

wherein A is a direct bond or a divalent linking group; $R^1$ is a hydrogen atom or a methyl group; and A is a group represented by the following general formula (I-a) or a nitrogen-containing heterocyclic group which is able to form a salt and which can have a substituent group:

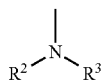
(I-a)

wherein $R^2$ and $R^3$ are each independently a hydrogen atom or a hydrocarbon group which can contain a heteroatom, and $R^2$ and $R^3$ can be the same as or different from each other;

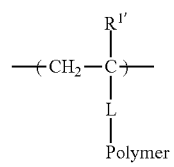
(II)

wherein $R^{1'}$ is a hydrogen atom or a methyl group; L is a direct bond or a divalent linking group; and Polymer is a polymer chain having at least one constitutional unit represented by the following general formula (III) or (IV):

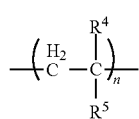
(III)

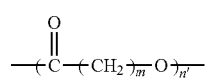
(IV)

wherein $R^4$ is a hydrogen atom or a methyl group; $R^5$ is a hydrocarbon group, a cyano group or a monovalent group represented by —[CH($R^6$)—CH($R^7$)—O]$_x$—$R^8$, —[(CH$_2$)$_y$—O]$_z$—$R^8$, —[CO—(CH$_2$)$_y$—O]$_z$—$R^8$, —CO—O—$R^9$ or —O—CO—$R^{10}$; $R^6$ and $R^7$ are each independently a hydrogen atom or a methyl group; $R^8$ is a hydrogen atom, a hydrocarbon group or a monovalent group represented by —CHO, —CH$_2$CHO or —CH$_2$COOR$^{11}$; $R^9$ is a hydrocarbon group, a cyano group or a monovalent group represented by —[CH($R^6$)—CH($R^7$)—O]$_x$—$R^8$, —[(CH$_2$)$_y$—O]$_z$—$R^8$ or —[CO—(CH$_2$)$_y$—O]$_z$—$R^8$; $R^{10}$ is an alkyl group having 1 to 18 carbon atoms; $R^{11}$ is a hydrogen atom or an alkyl group having 1 to 5 carbon atoms;

the hydrocarbon group can have a substituent group;

m is an integer of 1 to 5; n and n' are each an integer of 5 to 200; x is an integer of 1 to 18; y is an integer of 1 to 5; and z is an integer of 1 to 18;

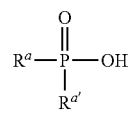
(V)

wherein $R^a$ and $R^{a'}$ are each independently a hydrogen atom, a hydroxyl group,
an alkyl group having 1 to 8 carbon atoms, or an aralkyl group having 7 to 11 carbon atoms, or an aryl group having 6 to 12 carbon atoms.

2. The metal particle dispersion according to claim 1, wherein the metal particles have an average primary particle diameter of 5 to 200 nm.

3. An article comprising a coating film, molded product or sintered film of the metal particle dispersion defined by claim 1 or of a composition containing the metal particle dispersion defined by claim 1.

4. The metal particle dispersion according to claim 1, wherein Polymer is a polymer chain having at least one constitutional unit represented by the following genera formula (III'):

(III')

wherein $R^4$ is a hydrogen atom or a methyl group; $R^5$ is a branched alkyl group having 3 to 18 carbon atoms or a monovalent group represented by —CO—O—$R^9$; $R^9$ is a branched alkyl group having 3 to 18 carbon atoms; and n is an integer of 5 to 200.

5. The metal particle dispersion according to claim 1, wherein the metal particles contain a metal compound containing the following (i), (ii) and (iii):
(i) copper;
(ii) one or more selected from the group consisting of indium, gallium, zinc, tin and aluminum; and
(iii) one or more selected from the group consisting of sulfur, selenium and tellurium.

6. A method for producing a sintered film, comprising the steps of:
forming a coating film by applying, onto a base material, a composition containing the metal particle dispersion defined by claim 1, and
baking the coating film.

7. A sintered film comprising a baked coating film of a composition containing the metal particle dispersion defined by claim 1.

* * * * *